(12) United States Patent
Smith et al.

(10) Patent No.: US 9,939,711 B1
(45) Date of Patent: Apr. 10, 2018

(54) LIGHT BASED COMPUTING APPARATUS

(71) Applicant: OPEN PORTAL ENTERPRISES (OPE), Theodore, AL (US)

(72) Inventors: Marcus Aaron Smith, Theodore, AL (US); Joshua Norman Smith, Theodore, AL (US); Robert Chad McCollum, Mobile, AL (US)

(73) Assignee: OPEN PORTAL ENTERPRISES (OPE), Theodore, AL (US)

( * ) Notice: Subject to any disclaimer, the term of this patent is extended or adjusted under 35 U.S.C. 154(b) by 471 days.

(21) Appl. No.: 14/294,212

(22) Filed: Jun. 3, 2014

Related U.S. Application Data

(60) Provisional application No. 61/922,633, filed on Dec. 31, 2013.

(51) Int. Cl.
*G02F 3/00* (2006.01)
(52) U.S. Cl.
CPC ...................................... *G02F 3/00* (2013.01)
(58) Field of Classification Search
None
See application file for complete search history.

(56) References Cited

U.S. PATENT DOCUMENTS

| | | | | |
|---|---|---|---|---|
| 4,382,660 A * | 5/1983 | Pratt, Jr. | ................... | G02F 3/00 359/244 |
| 4,729,111 A * | 3/1988 | Arrathoon | ............... | G02F 3/022 385/14 |
| 4,888,724 A | 12/1989 | Marom et al. | | |
| 5,010,505 A * | 4/1991 | Falk | ........................ | G06E 1/065 708/191 |
| 5,239,173 A * | 8/1993 | Yang | ........................ | G02F 1/21 250/214 LS |
| 5,446,579 A * | 8/1995 | Lomashevitch | .......... | G02F 3/00 359/107 |
| 5,646,395 A | 7/1997 | Miller | | |
| 5,770,851 A * | 6/1998 | Park | ....................... | G02F 3/028 250/208.1 |
| 6,326,910 B1 | 12/2001 | Hayduk et al. | | |
| 6,804,412 B1 | 10/2004 | Wilkinson | | |
| 6,990,281 B2 * | 1/2006 | Shahar | ................... | G02B 6/125 359/108 |
| 7,554,707 B1 * | 6/2009 | Golshan | ................. | G02B 6/125 359/107 |

(Continued)

FOREIGN PATENT DOCUMENTS

WO      2014087126 A1     6/2014

OTHER PUBLICATIONS

Communication dated Oct. 3, 2016, issued by the United States Patent and Trademark Office in U.S. Appl. No. 14/670,197.

(Continued)

*Primary Examiner* — Derek S Chapel
(74) *Attorney, Agent, or Firm* — Sughrue Mion, PLLC

(57) ABSTRACT

A computing apparatus has a logic unit configured to perform an arithmetic operation by relating light beams, each having a respective light amplitude, to obtain a light-based result of the operation, and to evaluate the light-based result to output a corresponding numeric result. The logic unit uses variables values, each corresponding to a respective distinct light amplitude, the variable values thereby corresponding to a plurality of distinct light amplitudes.

8 Claims, 39 Drawing Sheets

(56) References Cited

U.S. PATENT DOCUMENTS

| | | | |
|---|---|---|---|
| 7,747,102 B2 | 6/2010 | New et al. | |
| 8,610,839 B2 | 12/2013 | New et al. | |
| 9,280,848 B1 | 3/2016 | Chen et al. | |
| 2005/0211881 A1* | 9/2005 | Ponomarenko | G02F 3/00 250/214 LS |
| 2007/0268366 A1 | 11/2007 | Raskar | |
| 2008/0266626 A1* | 10/2008 | Zalevsky | G02B 6/2813 359/108 |
| 2009/0079987 A1 | 3/2009 | Ben-Ezra et al. | |
| 2014/0270758 A1 | 9/2014 | Nejadmalayeri et al. | |

OTHER PUBLICATIONS

Communication dated Nov. 2, 2016, issued by the United States Patent and Trademark Office in U.S. Appl. No. 14/294,212.

Woods, Damien and Naughton, Thomas J., "Optical Computing", Applied Mathematics and Computation, Oct. 2009, pp. 1417-1430, vol. 215, Issue 4, Elsevier Science Inc., New York, NY, USA.

Woods, Damien and Naughton, Thomas J., "Optical Computing: Photonic Neutral Networks", Nature Physics, Apr. 2012, pp. 257-259, vol. 8, Nature Publishing Group.

Woods, Damien and Gibson, J. Paul, "Lower Bounds on the Computational Power of an Optical Model of Computation", Unconventional Computation, Oct. 2005, pp. 237-250, Springer, Berlin, Heidelberg.

Woods, Damien and Gibson, J. Paul, "Complexity of Continuous Space Machine Operations", New Computational Paradigms, Jun. 2005, pp. 540-551, Springer, Berlin, Heidelberg.

Woods, Damien and Naughton, Thomas J., "An Optical Model of Computation", Theoretical Computer Science, Apr. 2005, pp. 227-258, vol. 334, Issues 1-3, Elsevier Science Publishers Ltd. Essex, UK.

Naughton, Thomas J. and Woods, Damien, "On the Computational Power of a Continuous-Space Optical Model of Computation", In:MCU '01 Proceedings of the Third International Conference on Machines, Computations, and Universality, May 2001, pp. 288-299, Springer-Verlag London, UK.

Abate, Tom, "Stanford Bioengineers Create Circuit Board Modeled on the Human Brain", Stanford Report, retrieved from: http://news.stanford.edu/pr/2014/pr-neurogrid-boahen-engineering-042814.html, Apr. 28, 2014, n.p., Aug. 22, 2017.

Goswami, Debabrata, "Optical Computing", Resonance: Journal of Science Education, Jun. 2003, pp. 56-71, vol. 8, Issue 6, Springer, India.

* cited by examiner

LIGHT BASED COMPUTING APPARATUS

CROSS-REFERENCE TO RELATED APPLICATION

This application claims priority to and the benefit of U.S. Provisional Patent Application No. 61/922,633 filed Dec. 31, 2013, the disclosure of which is incorporated by reference herein in its entirety.

BACKGROUND

As Moore's law hurtles towards obscurity, the need for computing systems relying on underlying technologies beyond semiconductors is becoming more and more apparent. Ever decreasing feature size offers diminishing gains in performance and energy consumption, and thus new approaches must be explored.

SUMMARY

Optoelectronic and electronic components form a hybrid system in which photons play a central role in the computation process. A light-based arithmetic computation apparatus associates light beams of specific amplitudes with variable values, and comingles an arbitrary combination of light beams according to user commands. The total amplitude of this arbitrary combination of light values is then valued and reported, in the form of its corresponding numerical value, thereby providing to the user an arithmetic sum of the combination while utilizing a small number of electrical components and computation steps.

DETAILED DESCRIPTION

Figure 1:
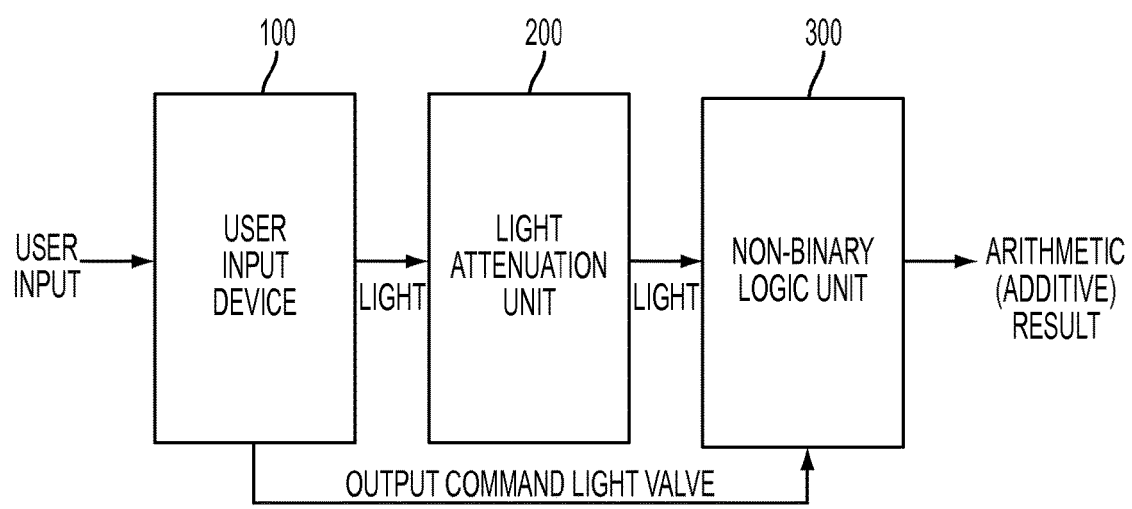
FIG. 1 shows a high level block diagram of a non-limiting exemplary embodiment.

As illustrated in FIG. 1, a light based arithmetic computing apparatus includes a user input device 100 which accepts user commands, a light attenuation unit 200 which creates light beams with specific amplitudes of light, and a logic unit 300 which performs arithmetic operations by relating the aforementioned light beams.

The non-limiting embodiment as introduced above will now be explained in detail, providing descriptions of each of the major components of the apparatus in conjunction with FIGS. 2, 3, 4, and 5.

Figure 2:
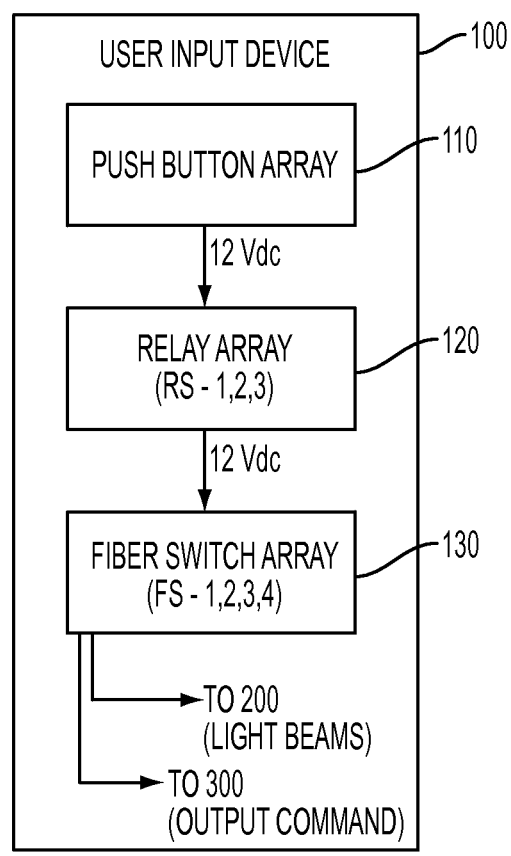
FIG. 2 shows a detailed block diagram of a non-limiting exemplary embodiment showing the components of a user input device.

FIG. 2 shows user input device 100, which accepts user commands and provides those commands to light attenuation unit 200 via a series of fiber-optic links. User input device 100 is comprised of push-buttons array 110, relay array 120, and fiber switch array 130. Pushbutton array 110 is comprised of a series of push-buttons, each of which denotes a logical value and corresponds to some predetermined light amplitude. Relay array 120 is comprised of a series of sets of relays, each set therein corresponding to a push button of push button array 110. Relay array 120 carries electrical signals from the push button array 110 to the fiber switches 130. Each fiber switch of the fiber switch array 130 corresponds to a set of relays, and therefore a pushbutton. When a push button is pressed, the associated set of relays triggers the associated fiber switch to emit a light beam (generated by any conventional means), for the duration of the depression of the switch, to the light attenuation unit 200 via a series of fiber-optic links.

Figure 3:
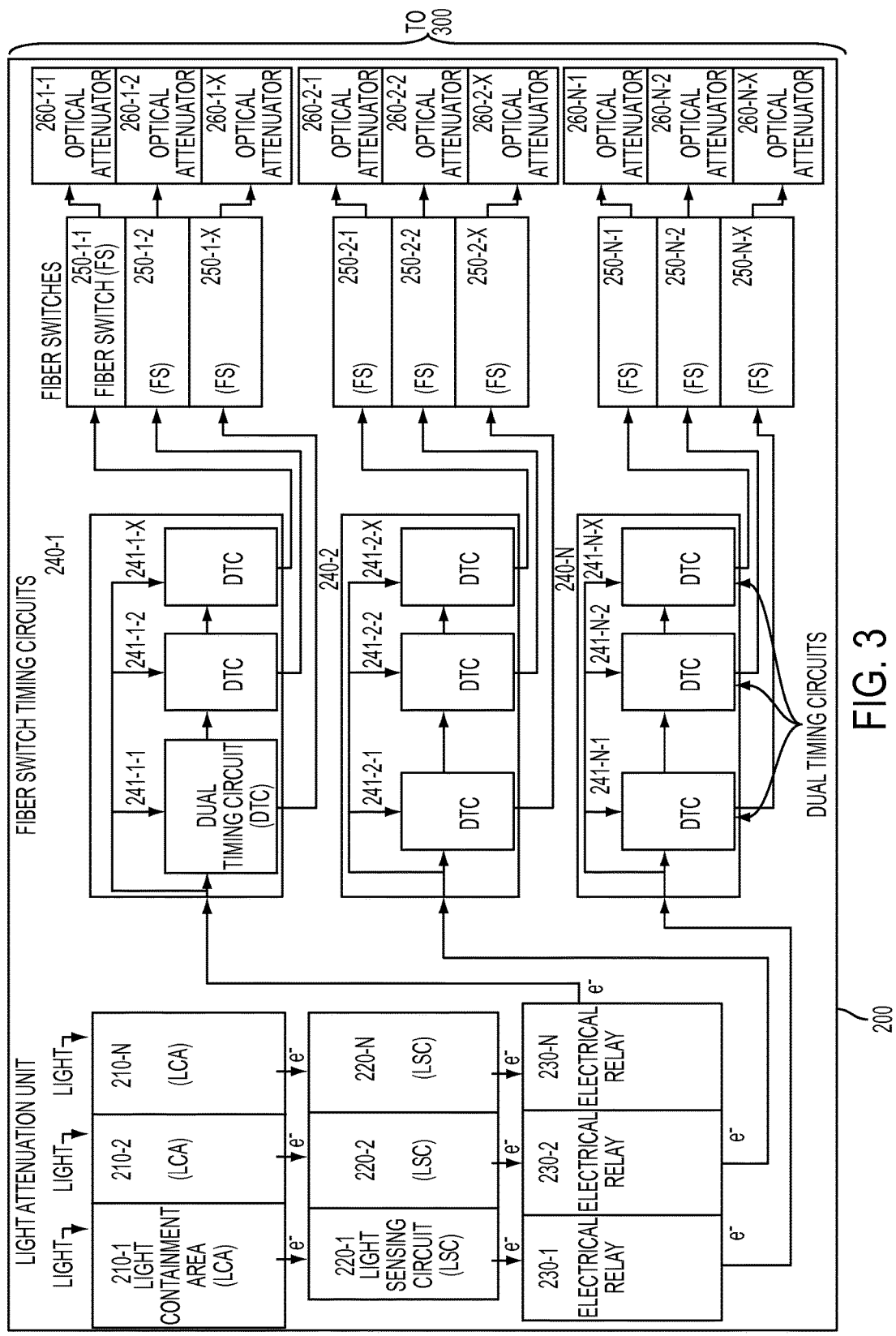
FIG. 3 shows a detailed block diagram of a non-limiting exemplary embodiment showing the components of a light attenuation unit.

FIG. 3 shows light attenuation unit 200, which is configured to capture user input, produce corresponding attenuated light beams, and to provide those attenuated light beams to logic unit 300. It is to be understood that, in this document, the term "beams" is not meant to imply any particular shape of light, unless specifically mentioned.

Light attenuation unit 200 is comprised of a plurality of light containment areas 210-1 through 210-N, a plurality of light sensing circuits 220-1 through 220-N, a plurality of electrical relays 230-1 through 230-N, fiber switch timing circuits 240-1 through 240-N, fiber switches 250-1-1 through 250-N-X, and optical attenuators 260-1-1 through 260-N-X. Fiber switch timing circuits 240-1 through 240-N are further comprised of dual timing circuits 241-1-1 through 241-N-X, where N is equal to the number of distinct user commands in push-button array 110 is capable of producing (i.e. the number of pushbuttons therein), and X is equal to the number of repeated instances of a particular user command that the light attenuation unit 200 is capable of recording. That is, a user command can only be repeatedly inputted to the system X times before further instances cease to be included in the final relation.

Light containment areas 210-1 through 210-N each connect to one of the fiber inputs originating from user input device 100; that is to say, each light containment area 210 is capable of receiving a light signal corresponding to a key press. Light containment areas 210 can be configured in a number of shapes including but not limited to: cubic, rectangular, spherical, and tubular, and can be internally plated with materials with reflective, non-reflective, or absorbent properties, among others. Associated with each light containment area 210 is a light sensing circuit 220. Each light sensing circuit 220 may include a photo sensor such as a photoconductive cell, among other electrical components, which facilitates the detection of a light beam within each light containment area 210. Upon detection of a light beam, one of the light sensing circuits 220 sends an electrical signal, via its corresponding relay 230, to its corresponding fiber switch timing circuit 240 (for example, light containment area 210-1 corresponds to light sensing circuit 220-1, electrical relay 230-1, and fiber switch timing board 240-1).

Each of fiber timing switches 240-1 through 240-N is comprised of a predetermined number of dual timing circuits 241. As a signal is provided to the fiber switch timing circuit 240, it subsequently provided to the first of the dual timing circuits 241, for example, dual timing circuit 241-1-1, therein.

Figure 4:
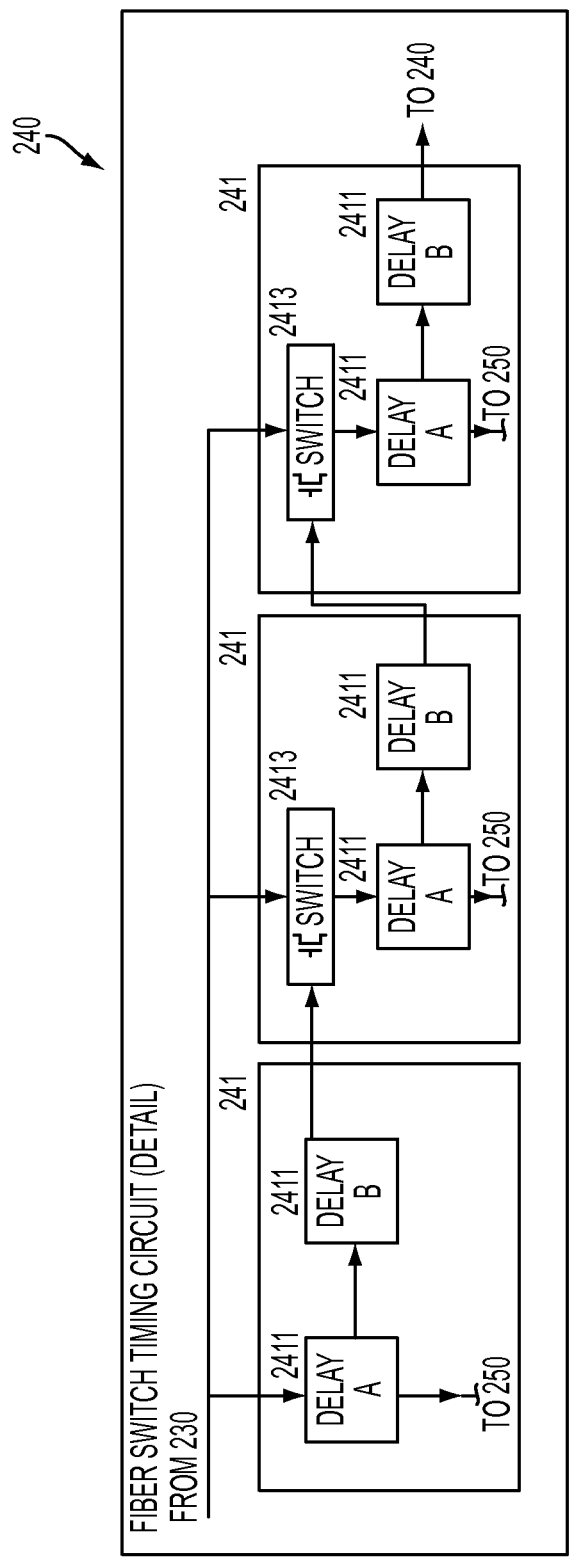
FIG. 4 shows a detailed block diagram of a non-limiting exemplary embodiment showing the components of a fiber switch timing circuit.

Referring to FIG. 4, each dual timing circuit 241 contains a pair of delay circuits 2411, the first of which (A), after receiving a signal at its input, at least triggers a relay (not shown) to open, and remain open, via a seal-in circuit or the like, thus sending an electrical signal to a fiber switch 250. Simultaneously, this first delay circuit (A) also triggers the second delay circuit (B), the pair adding a nontrivial temporal hold to the signal path. The second delay circuit (B) next triggers another relay (not shown) to open, and remain open, via a seal-in circuit or the like, thus sending an electrical signal to a fiber switch 250. This open relay further opens a signal path, via switch 2413, from electrical relay 230-1 to the input of dual timing circuit 241-1-2 seen in FIG. 3. In this way, dual timing circuit 241-1-2 cannot be triggered by a user command until a user command (be it the same long key press or a previous press of the same key) has triggered dual timing circuit 241-1-1, and a nontrivial temporal delay has occurred. In the same manner, dual timing circuit 241-1-3 cannot be triggered by a user command until dual timing circuit 241-1-2 has been triggered and a nontrivial temporal delay has occurred. It is important to note that the first dual timing circuit 241 of a given fiber timing switch circuit 240 does not necessarily contain a switch 2413, and if switch 2413 is present, it is in a persistent open state. This process may continue in a number of iterations corresponding to the number of dual timing circuits 241 within each fiber timing circuit 240. FIG. 4 shows delay B of the final dual timing circuit 241 feeding into a further potential dual timing circuit 241. In this way, the fiber switch timing circuit can be extended in purpose to record further instances of the same user input. In short, fiber switch timing circuit 240 allows retention of multiple instances of the same user input, and protects against erroneous recordation of user input.

In FIG. 3, any and all dual timing circuits 241 which have been triggered open relays (not shown, and which stay open until a system wide power cycle occurs) associated with respective fiber switches 250-1-1 through 250-N-X. Each fiber switch 250 provides a light beam (generated by any conventional means) to an optical attenuator with corresponding identifiers (i.e. 250-1-1 connects to 260-1-1). These optical attenuators 260 attenuate light beams provided by the fiber switches 250 to specific light amplitudes. The light amplitude after attenuation achieved by each optical attenuator 260 is tuned to match one of the light amplitudes corresponding to possible user commands, depending on which of the fiber switch timing circuits 240 the attenuator is associated with. The resulting attenuated light beam or light beams are then passed to the logic unit 300.

Figure 5:
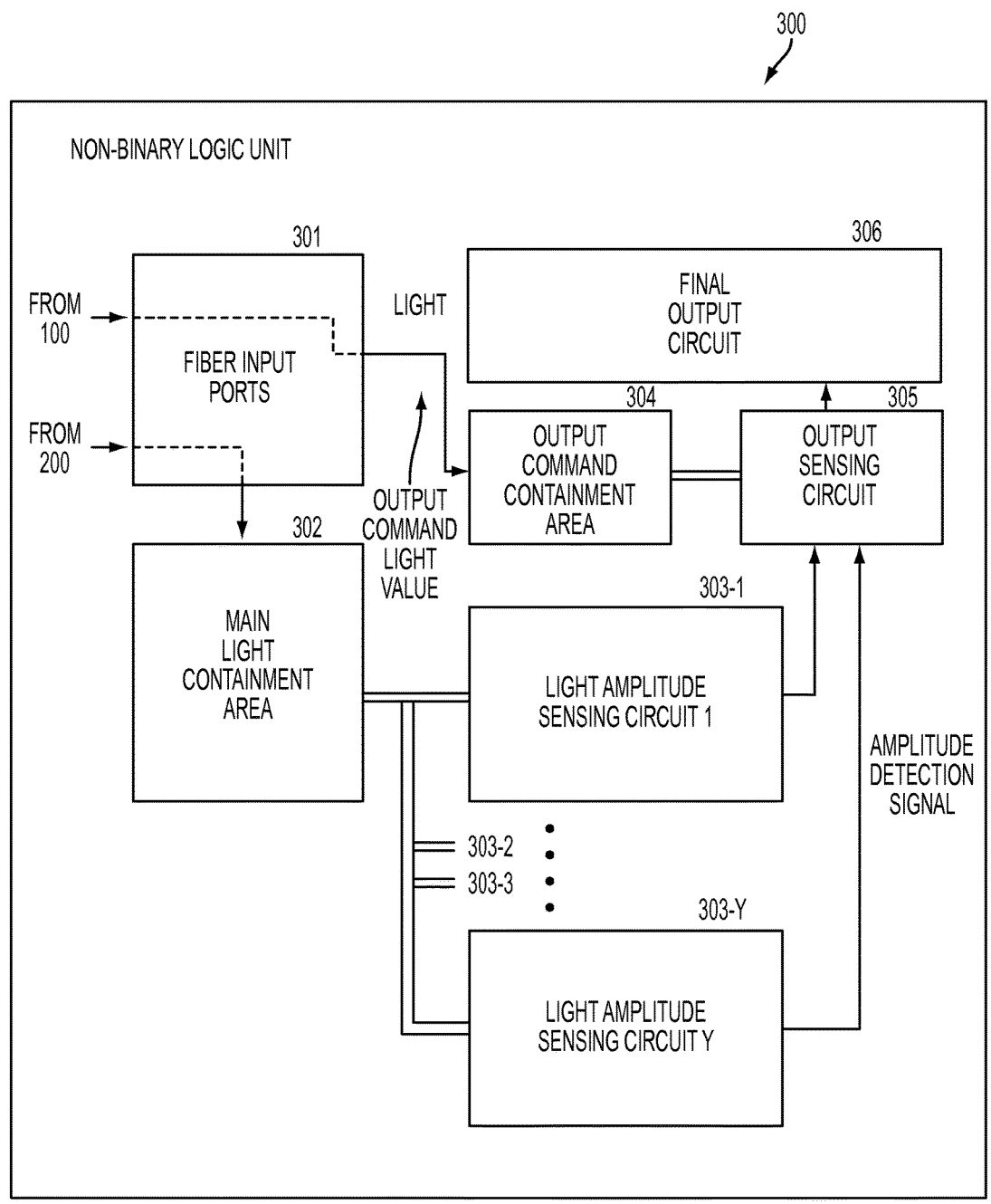
FIG. 5 shows a detailed block diagram of a non-limiting exemplary embodiment showing the components of a logic unit.

FIG. 5 shows logic unit 300, which is configured to perform arithmetic operations by relating a plurality of light beams, each having a respective light amplitude, to obtain a light-based result of the arithmetic operation, and to evaluate the light-based result to determine and output a corresponding numeric result, wherein the logic unit is further configured to evaluate the light-based result in accordance with variable values, each corresponding to a respective distinct light amplitude of a plurality of distinct light amplitudes. Logic unit 300 is comprised of fiber input ports 301-1 through 301-N-X (shown as a contiguous block), main light containment area 302, light amplitude sensing circuits 303-1 through 303-Y, output command containment area 304, output sensing circuit 305, and final output circuit 306, where Y is equal to the number of distinct amplitudes that are detectable by the logic unit 300.

Fiber input ports 301-1 through 301-N-X are connections between light attenuation unit 200 and main light containment area 302 in the case of the attenuated light beams. These may be understood to constitute light entry ports of the main containment area. In the case of an output command light value, another fiber port receives a signal directly from user input device 100 and routes it to output command containment area 304.

Main light containment area 302 is the destination for attenuated light beams transmitted from light attenuation unit 200, and can be configured in a number of shapes including but not limited to: cubic, rectangular, spherical, and tubular, and can be internally plated with materials with reflective, non-reflective, or absorbent properties, among others. Light beams are related to create a single related light beam, which can then be evaluated to find the arithmetic result of the relation of the individual light beams provided to main light containment area 302. The arithmetic result may be, but is not limited to, a sum. Mounted within main light containment area 302 are the sensing portions of each of the light amplitude sensing circuits 303. These sensing portions may be photoconductive cells or other photosensitive devices.

Light amplitude sensing circuits 303-1 through 303-Y are configured to detect amplitudes of light within main light containment area 302 through the use of a photosensitive device of some configuration and a window comparator or the like. Specific predetermined threshold values may be determined which configure each light amplitude sensing circuit 303 to detect a specific light amplitude. Upon detecting the specific light amplitude which it is configured to detect, each light amplitude sensing circuit 303 is configured to produce an amplitude detection signal and provide it to output sensing circuit 305. In another embodiment, a single light amplitude sensing circuit 303 may be used to detect multiple amplitudes of light in place of multiple instances. As the relational effects which take place in the main light containment area are essentially instantaneous from an electrical viewpoint, only one amplitude sensing circuit 303 should produce an amplitude detection signal at any given time.

Output command containment area 304 is a type of secondary light containment area. Other types of secondary light containment areas might include addition command containment areas and subtraction command containment areas, among other secondary light containment areas. Output command containment area 304 is the destination for an output command light value transmitted from user input device (generated in any conventional manner), and can be configured in a number of shapes including but not limited to: cubic, rectangular, spherical, and tubular, and can be internally plated with materials with reflective, non-reflective, or absorbent properties, among others. Mounted within output command containment area 304 is the sensing portion of the output sensing circuit 305. This sensing portion may be a photoconductive cell or another photosensitive device.

Output sensing circuit 305 is configured to provide a final output signal to final output circuit 306 upon detecting an output command light value within output command containment area 304, and to accept an amplitude detection signal from any one of the light amplitude sensing circuits 303. The amplitude of the output command light value is of little consequence, and thus output sensing circuit 305 produces a final output signal upon detecting the presence of any amplitude of light with output command containment area 304. Output sensing circuit 305 is comprised of a photosensitive device (and supporting components) of some configuration and a series of relays which can receive the output command light value and the amplitude detection signal. When the output command light value is detected, the final output signal is sent to final output circuit 306 indicating the amplitude and corresponding numerical value that was detected, if any, according to the amplitude detection signal. Output sensing circuit 305 is configured to accept an amplitude detection signal from any one of the light amplitude sensing circuits 303, but only one light amplitude detection signal should be received at a given time, barring the presence of two light amplitude sending circuits 303 calibrated to detect the same light amplitude.

Final output circuit 306 is comprised of relays and fiber optic switches. Final output circuit 306 indicates via a fiber optic switch or other user identifiable element the amplitude and corresponding numerical value that were detected. In short, the logic unit 300 relates one or more light beams, determines the result of the relation, and indicates that result to the user.

The schematic layout of an exemplary embodiment of the instant application is now discussed to help the reader better understand an example embodiment of the system.

Figure 6:
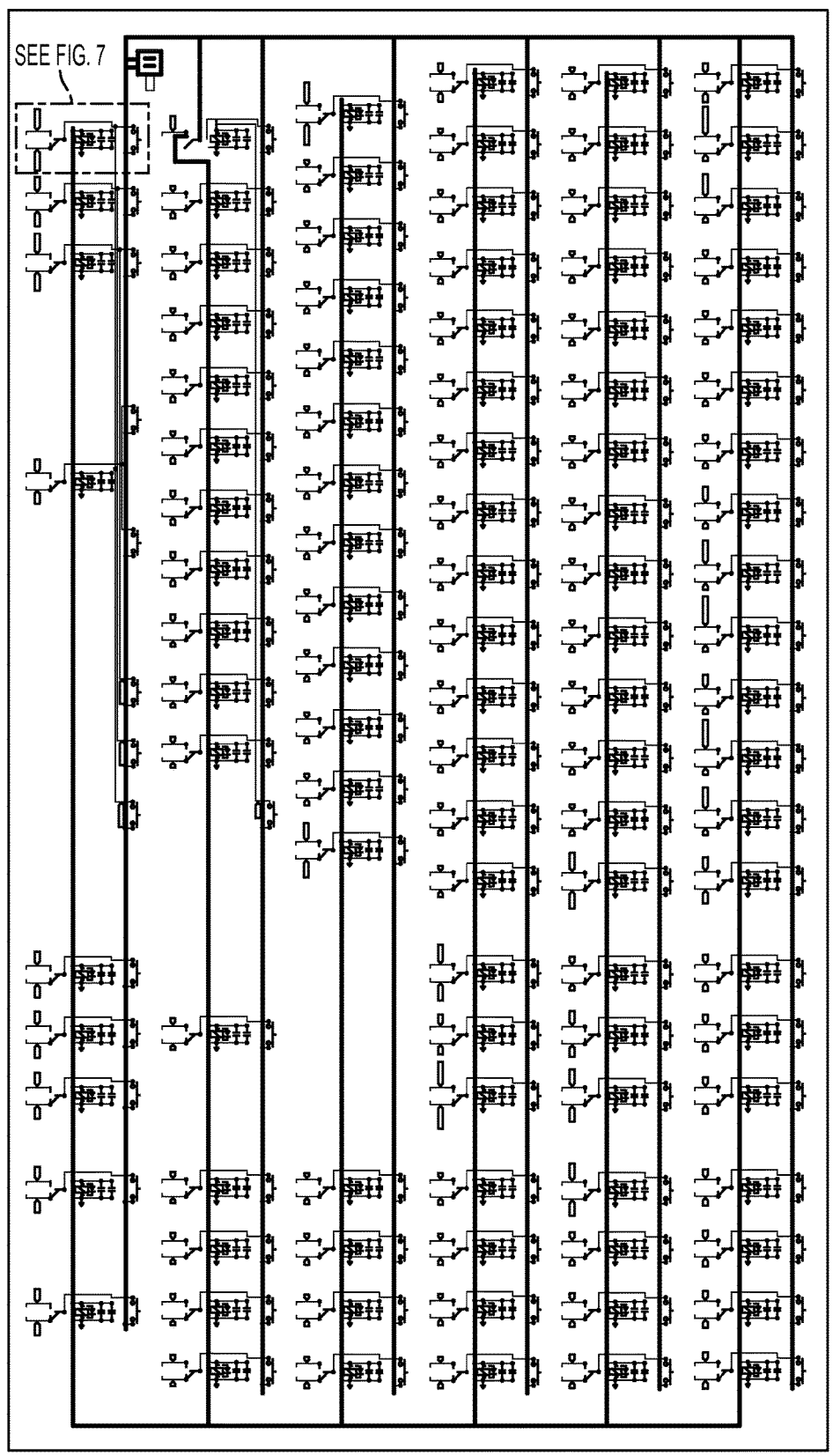
FIG. 6 shows a schematic describing an overview of a non-limiting exemplary embodiment of the user input device.
Figure 7:
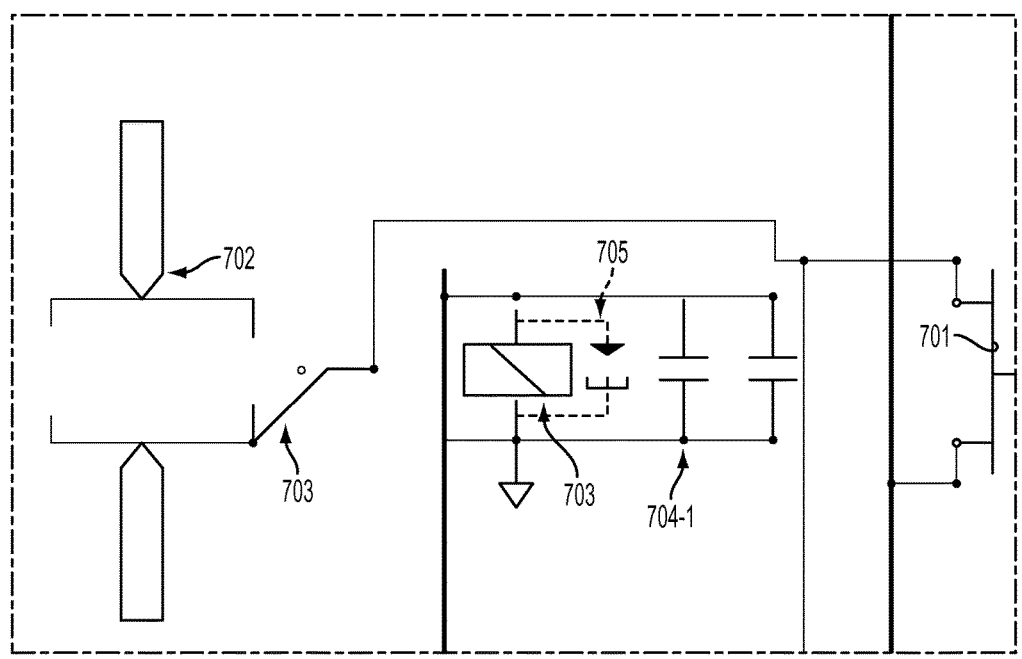
FIG. 7 shows granular view of a subsection of the schematic in FIG. 6.

An exemplary embodiment of the user input device 100 is depicted in FIGS. 6 through 12. FIG. 6 shows an overview of a plurality of pushbuttons and relays that constitute the bulk of the user input device. FIG. 7 shows a subsection of FIG. 6 in which a pushbutton switch 701 and connected relay 703 are depicted. It is important to note that all electrical relays in the drawings of the instant application are depicted twofold, with one depiction showing the connections regarding each of the three pins of the relay, and the other depiction showing the relay's connections to associated components (i.e. capacitors and diodes). All relays are shown in the same fashion, such that the two depictions are always adjacent. Capacitors 704 and diode 705 are connected to relay 702. Relay 702 connects to port 703, which in turn connects to voltage regulator 1201, seen in FIG. 12 (a description of which will follow later).

Figure 8:
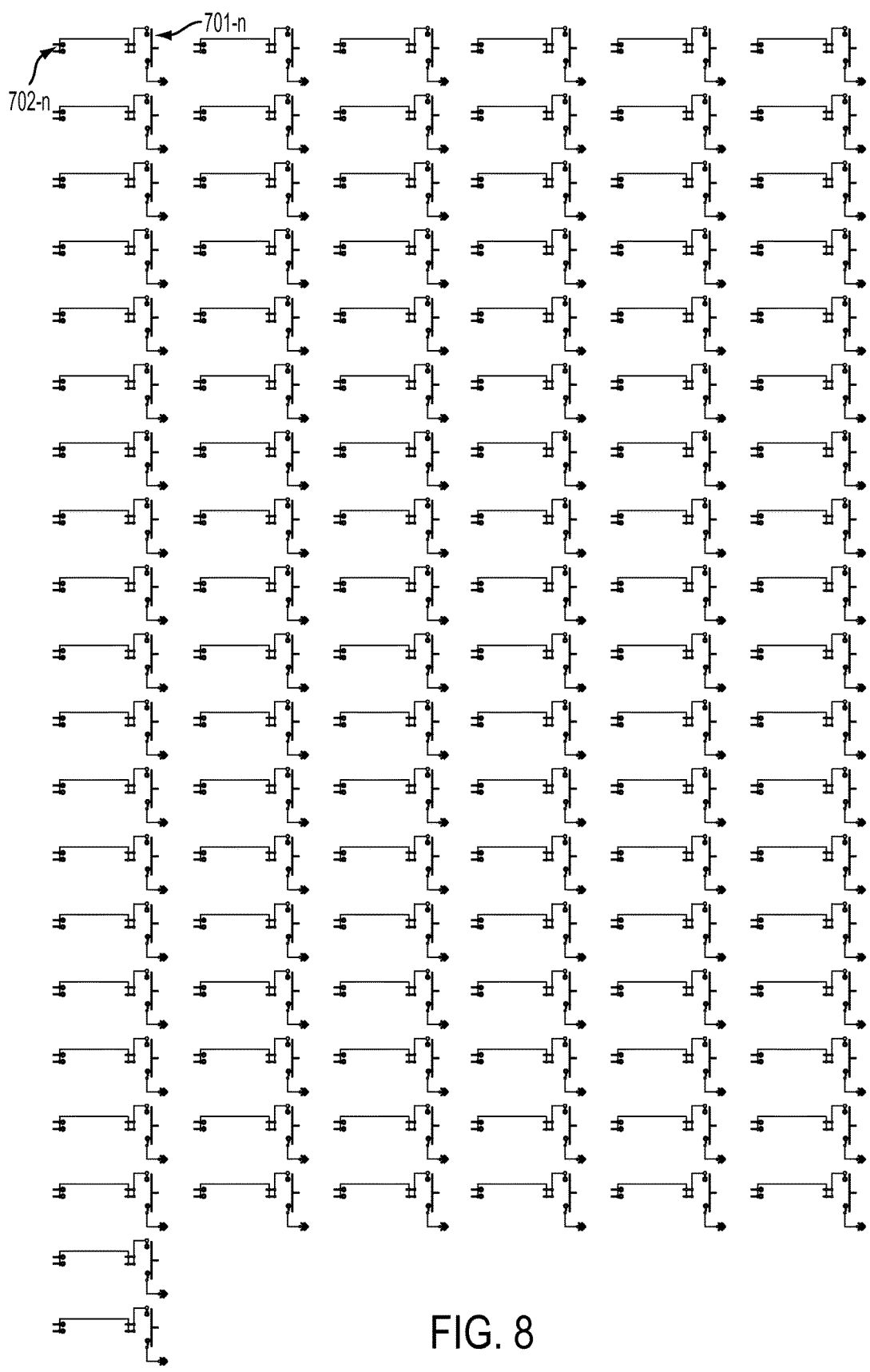
FIG. 8 shows a schematic describing another representation of a non-limiting exemplary embodiment of the user input device.
Figure 9:
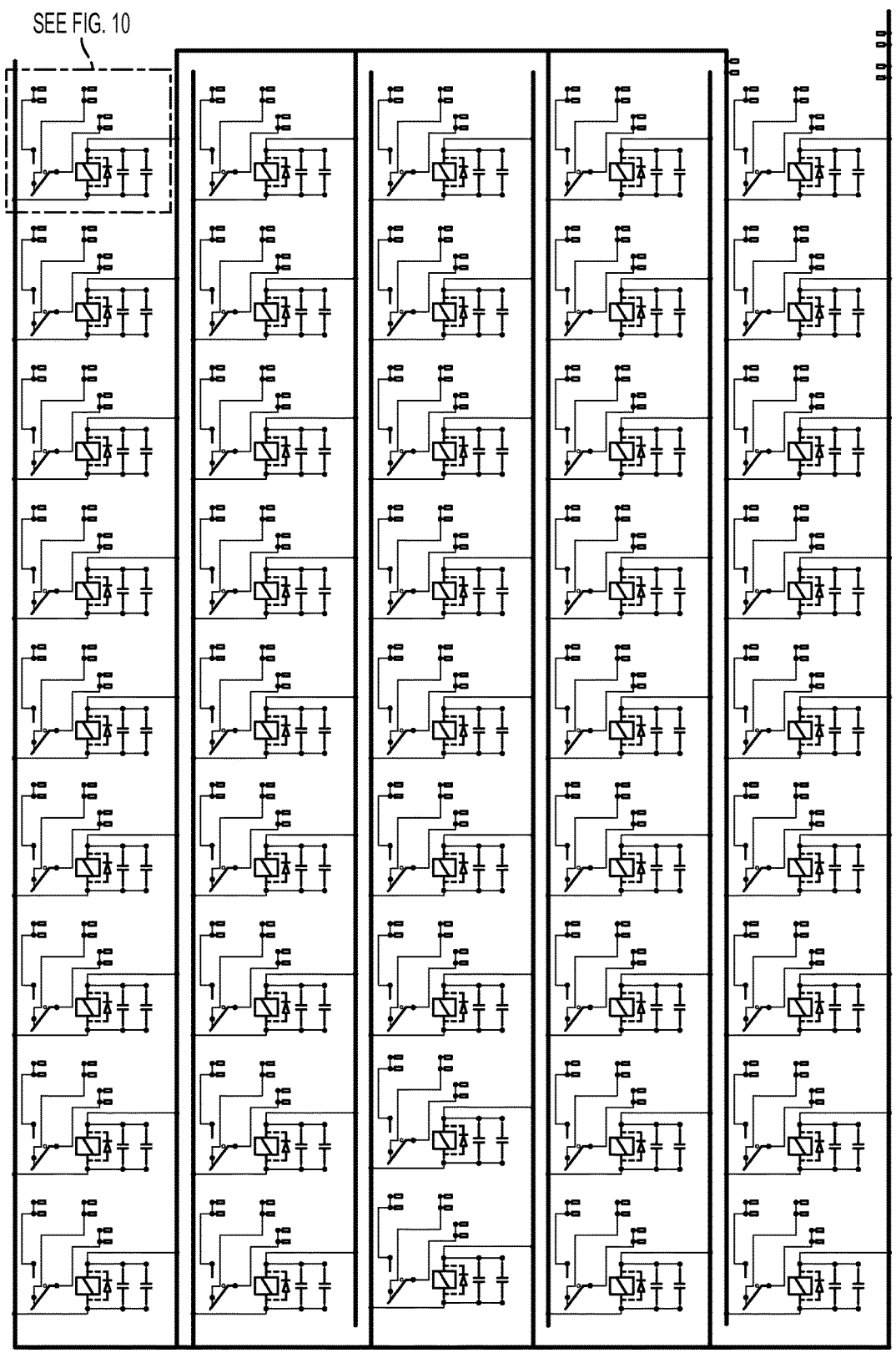
FIG. 9 shows a schematic describing another representation of a non-limiting exemplary embodiment of the user input device.
Figure 10:
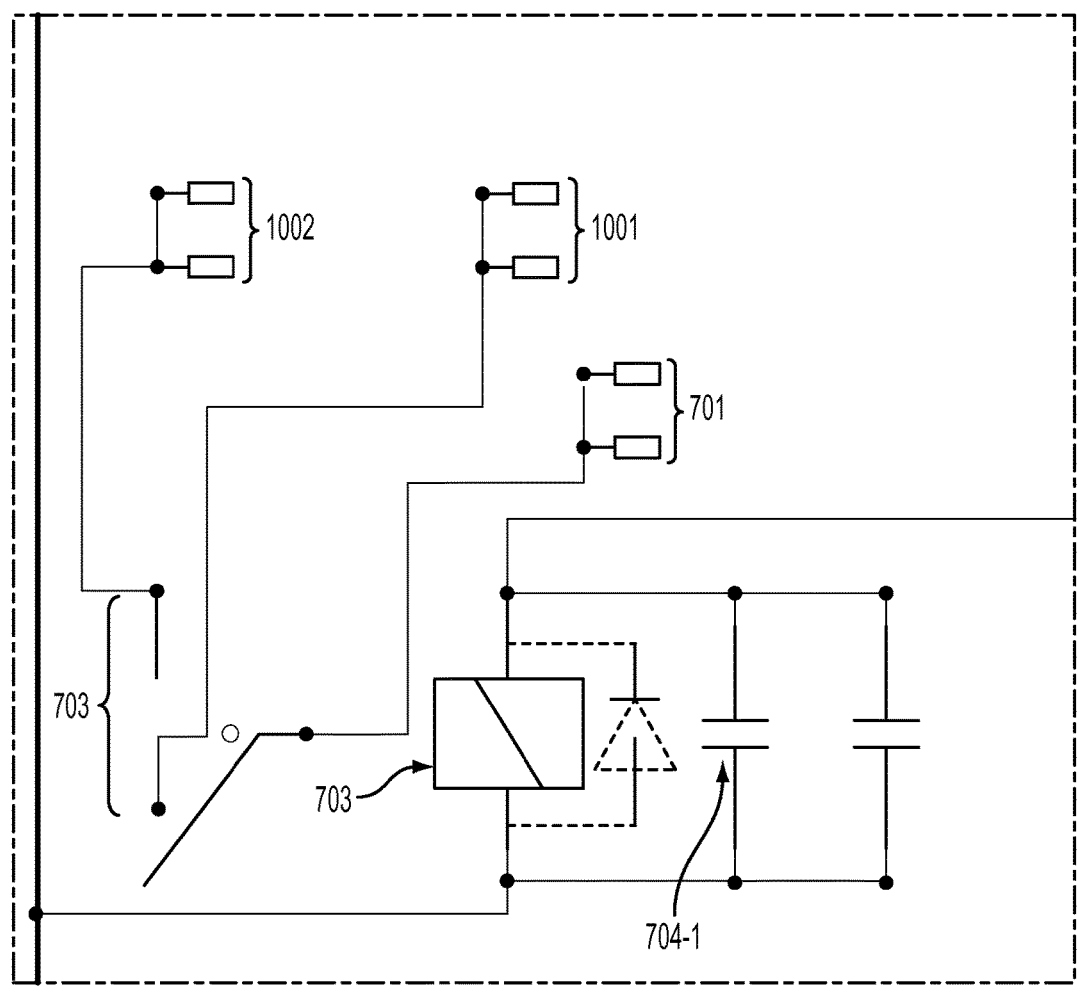
FIG. 10 shows granular view of a subsection of the schematic in FIG. 9.
Figure 11:
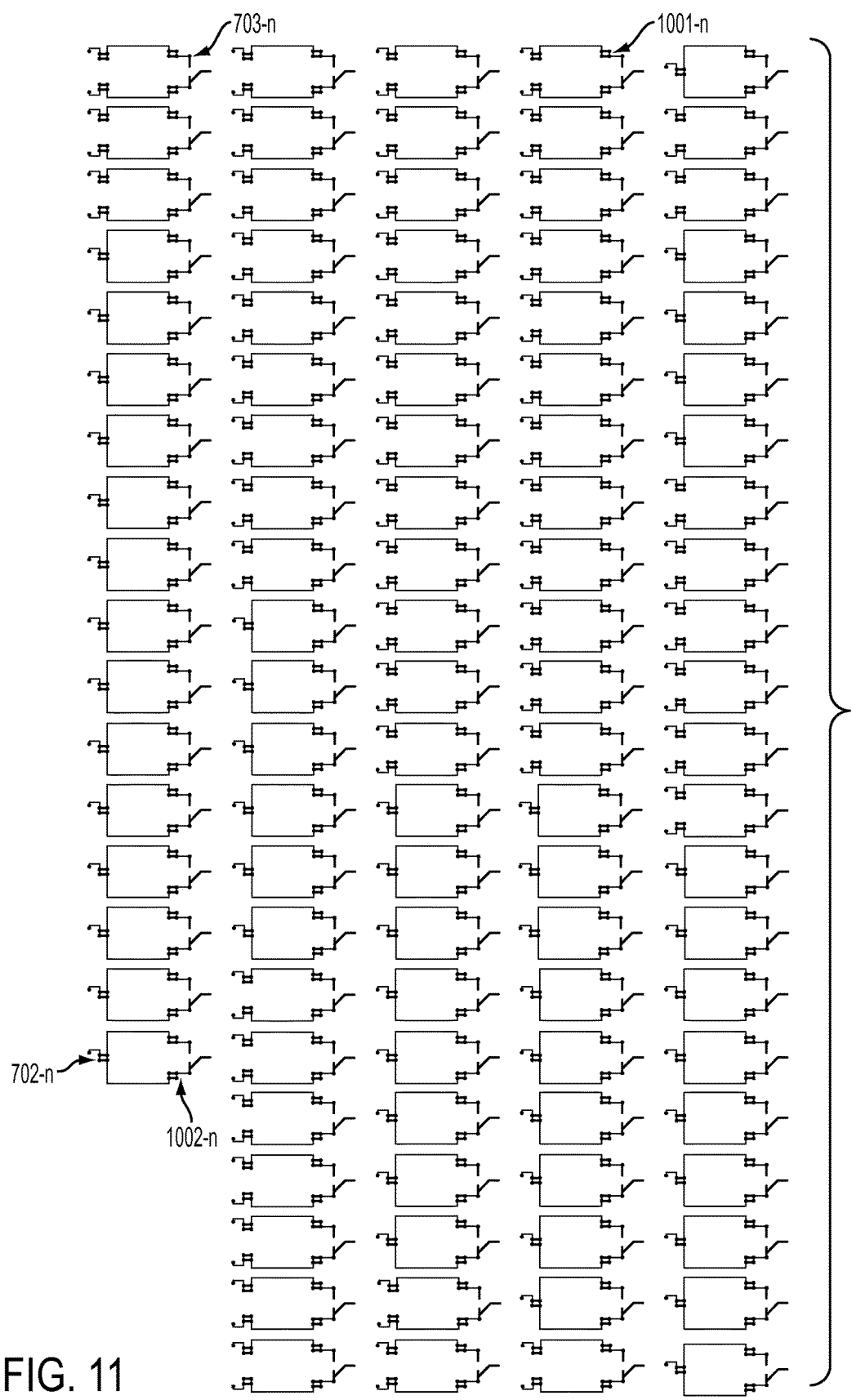
FIG. 11 shows a schematic describing another representation of a non-limiting exemplary embodiment of the user input device.

FIG. 8 shows a different representation of the plurality of pushbuttons in FIG. 6; the connection(s) to port 702 are unchanged. It is important to note that in this figure, the suffix "-n" has been appended to both port 702 and pushbutton switch 701, meaning that these are repeated components, where n is some number between 1 and the total number of pushbutton switches 701 in the first exemplary embodiment. This nomenclature follows throughout the embodiment. FIG. 9 shows another representation of the plurality of relays depicted in FIG. 6. FIG. 10 shows a subsection of FIG. 9 in which relay 703 and its associated connections are shown in detail. The center pin of relay 703 connects to port 702, and the two remaining ports of relay 703 connect to intermediary ports 1001 and 1002. FIG. 11 shows the electrical connections between relay 703, via ports 1001 and 1002, to port 702 for a plurality of instances thereof.

Figure 12:
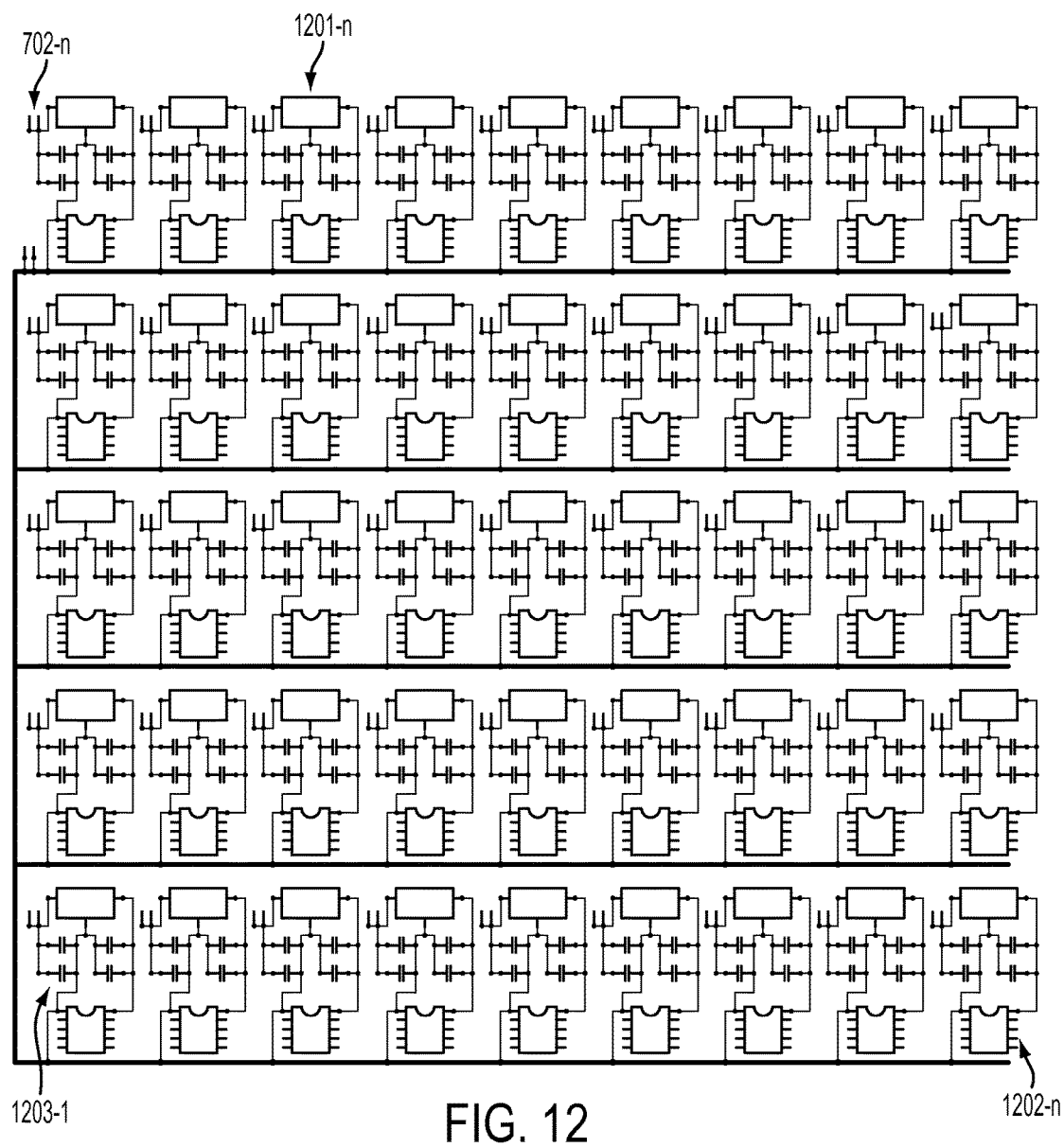
FIG. 12 shows a schematic describing a non-limiting exemplary embodiment a plurality of fiber switches of the user input device.

Finally, FIG. 12 depicts a plurality of voltage regulators and fiber optic switches associated with the user input device 100. Voltage regulator 1201 is connected to port 703, as mentioned previously, and to capacitors 1203 and fiber switch 1202.

Figure 13:
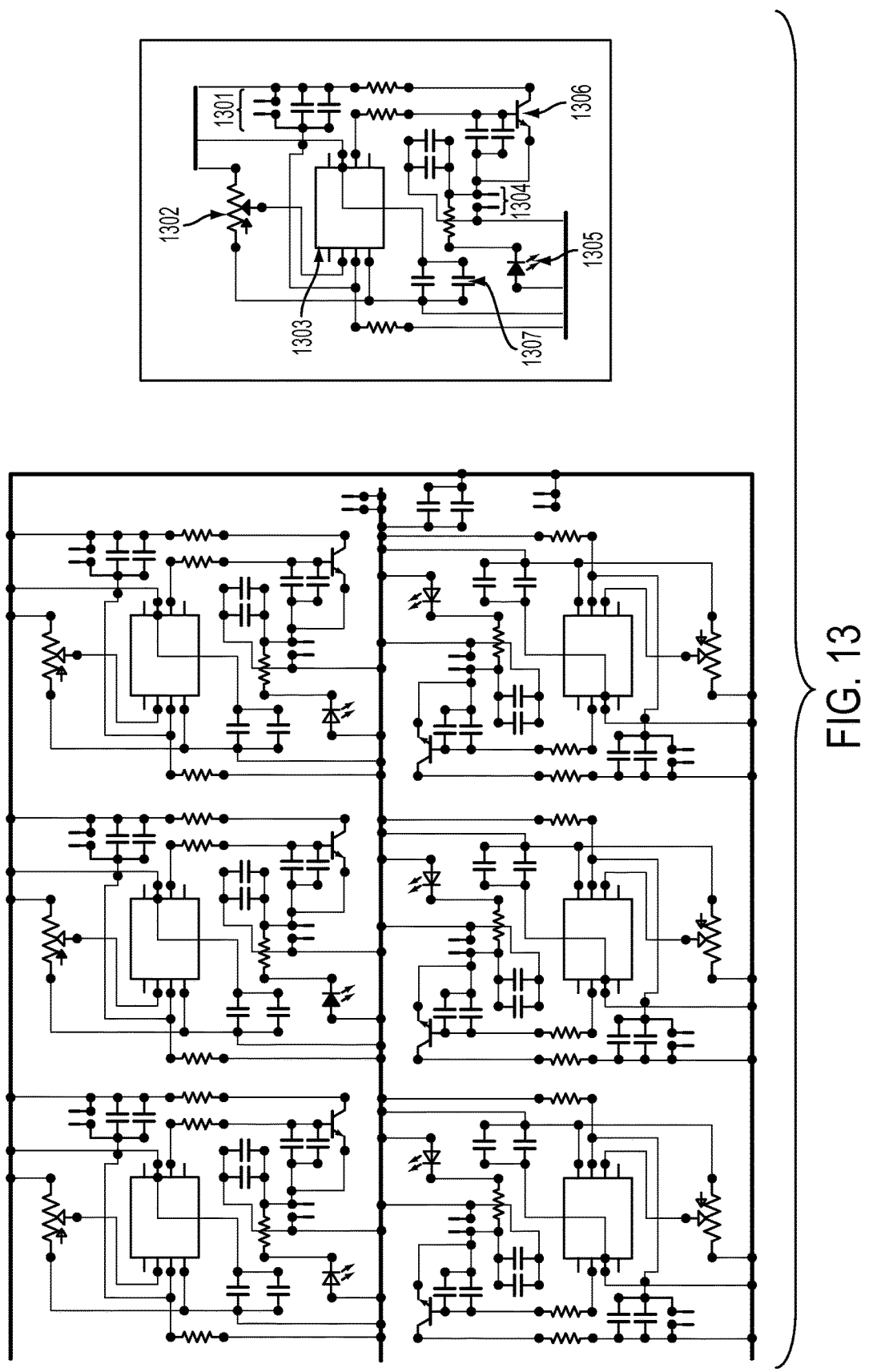
FIG. 13 shows a schematic describing a non-limiting exemplary embodiment of a plurality of light sensing circuits associated with the light attenuation unit.
Figure 14:
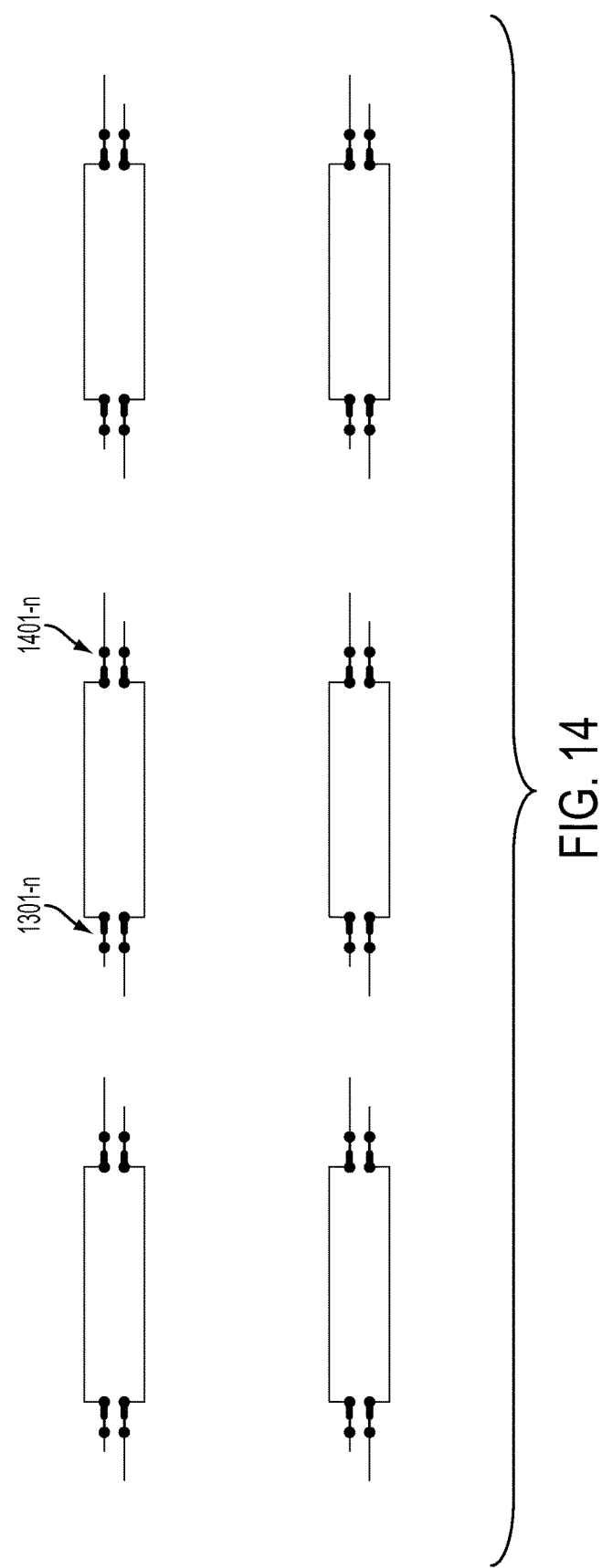
FIG. 14 shows a schematic describing electrical connections between FIGS. 13 and 15.
Figure 15:
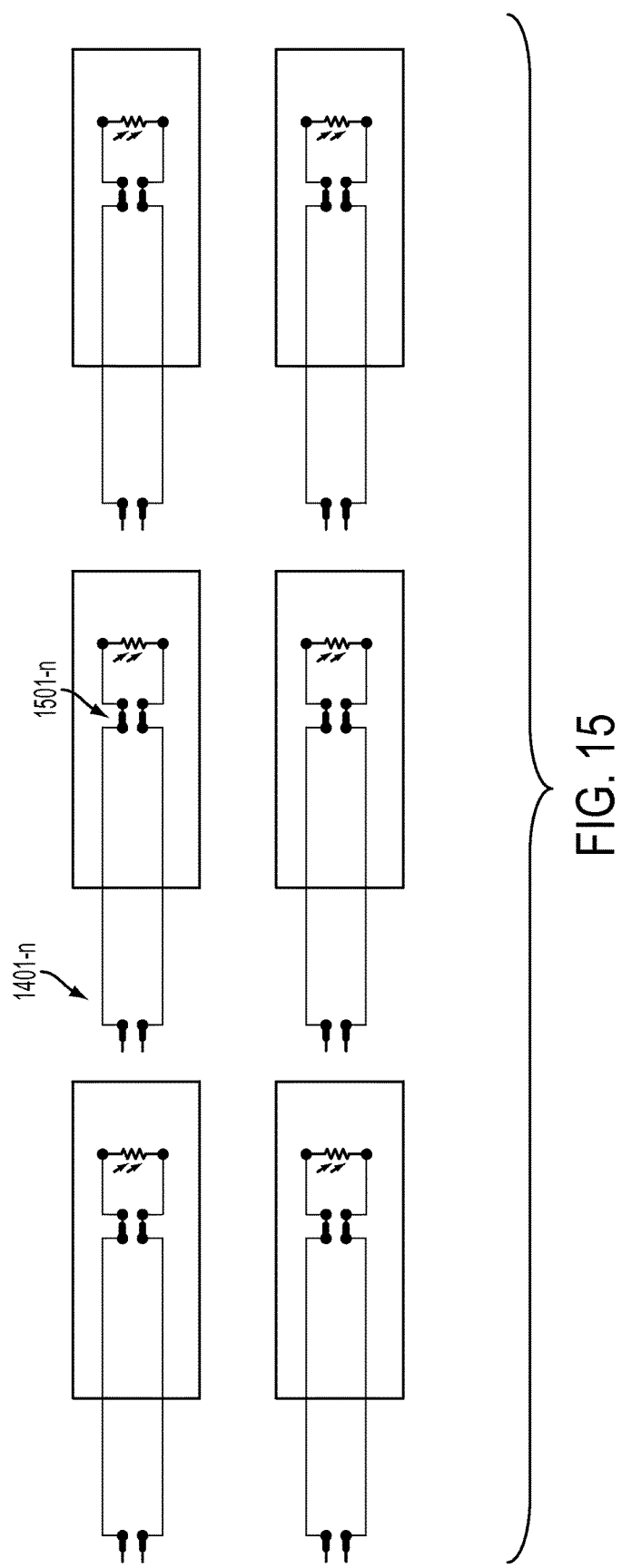
FIG. 15 shows a schematic describing a non-limiting exemplary embodiment of a plurality of photoconductive cells associated with the light attenuation unit.
Figure 16:
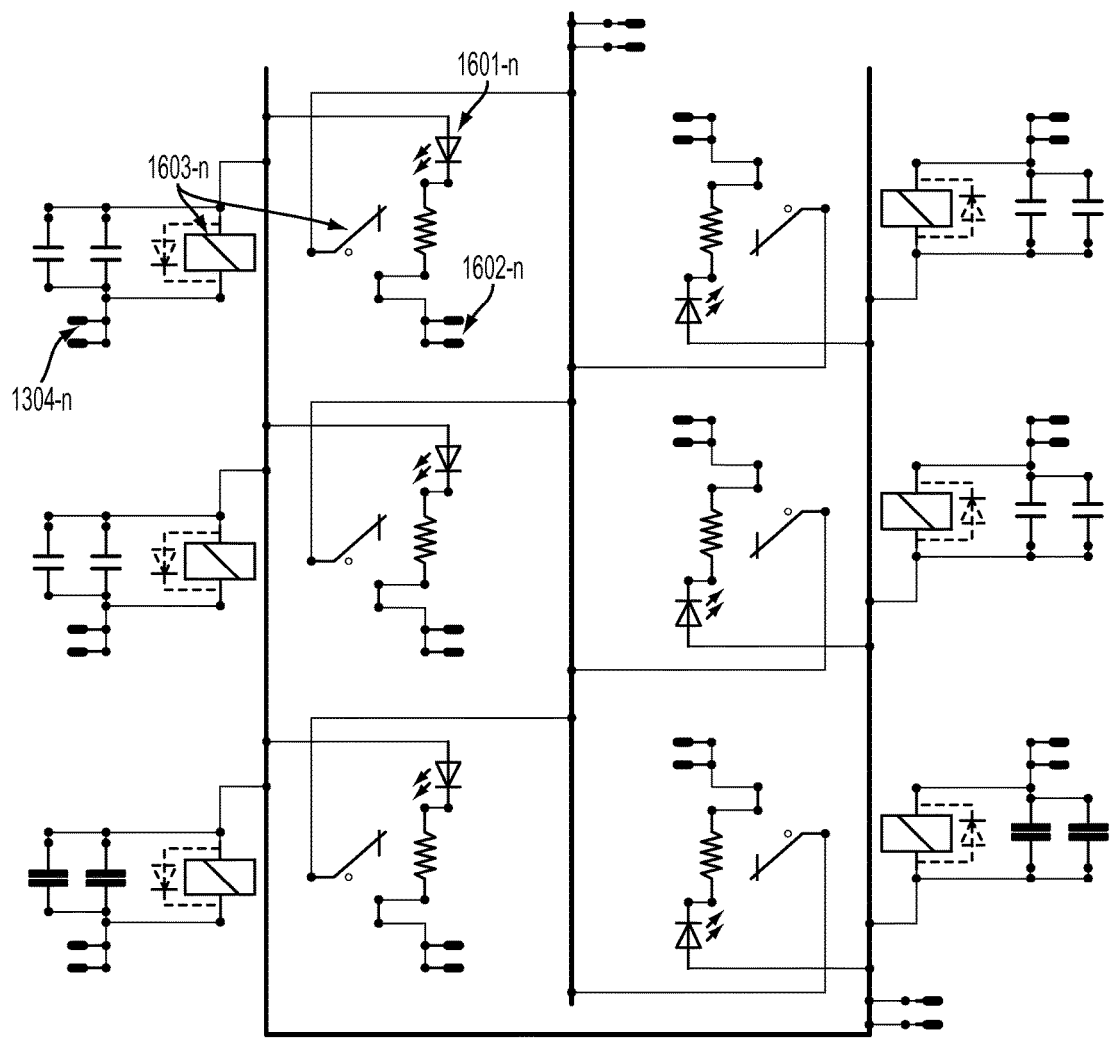
FIG. 16 shows a schematic describing a non-limiting exemplary embodiment of a plurality of relays within the light attenuation unit.
Figure 17:
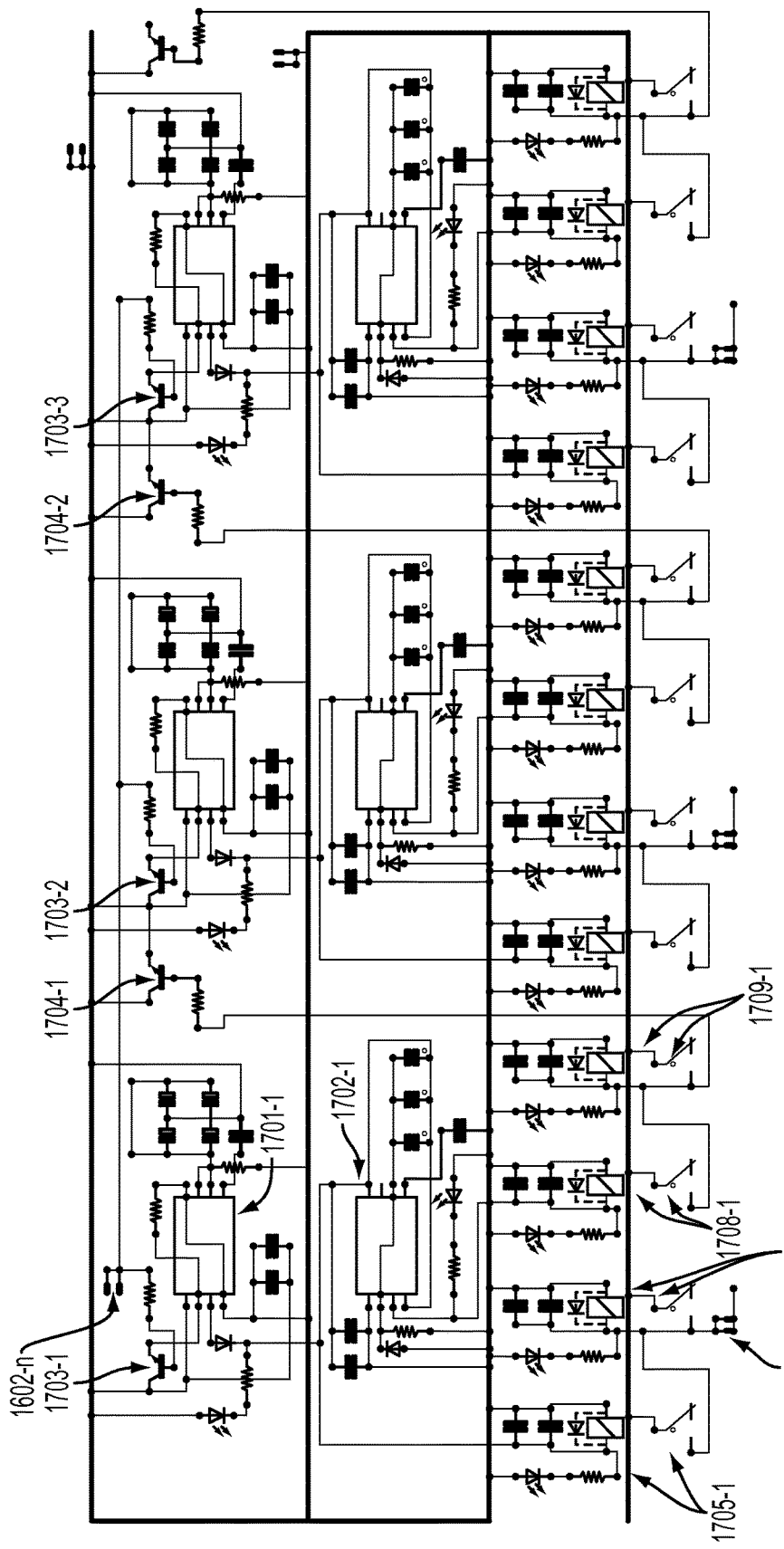
FIG. 17 shows a schematic describing a non-limiting exemplary embodiment of a fiber switch timing circuit.

An exemplary embodiment of the light attenuation unit 200 is depicted in FIGS. 13 through 19. FIG. 13 shows a plurality of light sensing circuits 220 of the light attenuation unit 200. One instance is shown separate from the others for explanatory purposes. Other instances are shown clustered, much as in other schematics describing this embodiment, such that the instances can share common power and ground rails. Port 1301 connects to port 1401 in FIG. 14, which in turn connects to photoconductive cell 1501 in FIG. 15. Trimmer 1302 connects at least to operational amplifier 1303, a power rail, and to one or more capacitors 1306. LED 1305 connects to a resistor and to a power rail. Transistor 1306 serves as an intermediary between the power rail and port 1304, with operational amplifier 1303 driving its base. Finally, port 1304 connects to relay 1603, shown in FIG. 16. As mentioned, FIG. 14 shows the connection between ports 1301 and 1401, and FIG. 15 shows the connection between ports 1401 and 1501. FIGS. 13-15 constitute the components of a plurality of light sensing circuits 220. FIG. 16 shows a plurality of electrical relays, each equivalent to electrical relay 230, and each of which serves as an intermediary between a light sensing circuit 220 and a fiber switch timing circuit 240. Relay 1603 connects to LED 1601, which in turn connects to port 1602. Port 1602 connects to a fiber switch timing circuit 240, as shown in FIG. 17.

FIG. 17 shows a plurality of delay-on circuits 3800 and delay-off circuits 3900, a plurality of associated relays, and further electrical components. The combination thereof constitutes three dual timing circuits 241. The input of timer chip 1701 is connected at least to transistor 1703. The output of timer chip 1701-1 is connected at least to timer chip 1702-1 via a series of capacitors, resistors and LEDs, and to relay 1705-1. Timer chip 1701-1 is additionally connected to appropriate power rails via a further series of capacitors, resistors, and LEDs. Timer chip 1702-1 is further connected at least to relay 1706-1, 1708-1, and appropriate power rails via a further series of capacitors, resistors, and LEDs. Relay 1705-1 connects at least to relay 1706-1 and timer chip 1702-1. Relay 1706-1 connects to port 1707-1. Relay 1708-1 connects to relay 1709-1, which in turn connects to transistor 1704-1, thereby driving its base. Transistor 1704-1 serves as an intermediary between a power rail and transistor 1703-2. Transistors 1704-2 and 1703-3 share an identical relationship.

Figure 18:
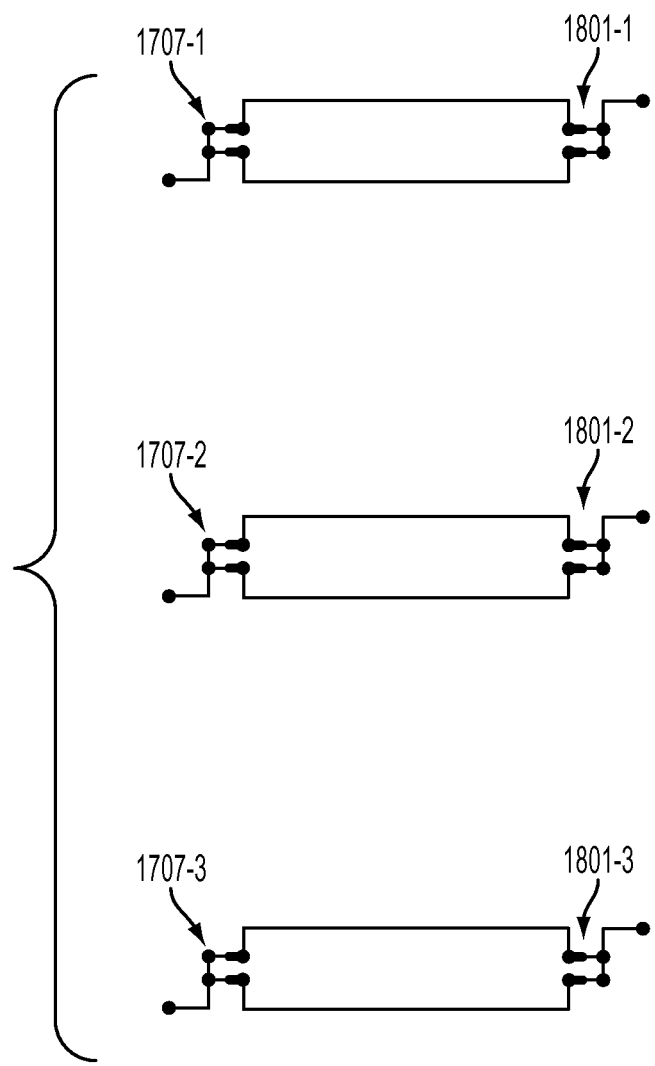
FIG. 18 shows a schematic describing electrical connections between FIGS. 17 and 19.
Figure 19:
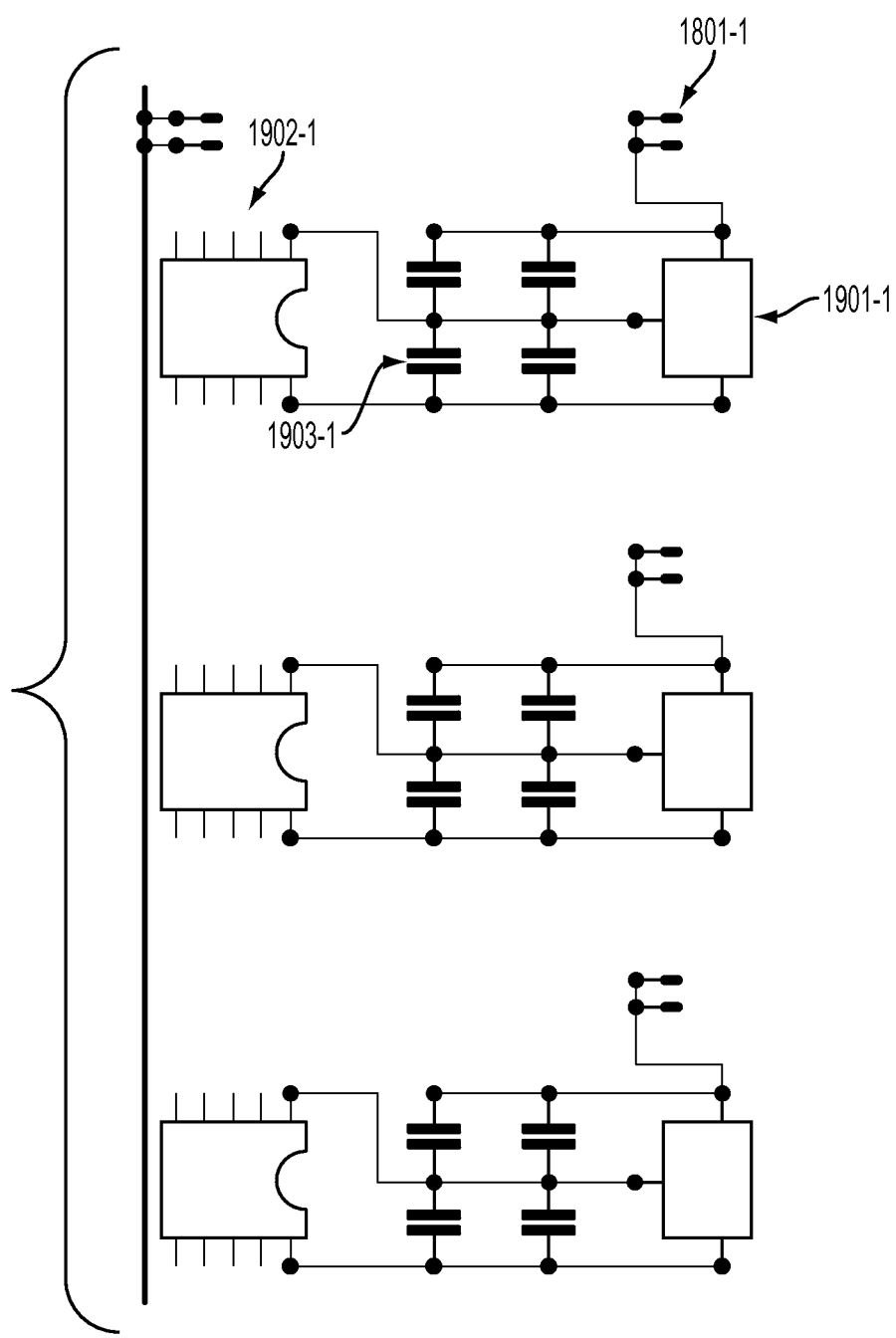
FIG. 19 shows a schematic describing a non-limiting exemplary embodiment of a plurality of fiber switches associated with the light attenuation unit.

FIG. 18 shows the connection between ports 1707 and 1801. It should be noted that three instances of this connection are shown, matching the three dual timing circuits 241 shown in FIG. 17. FIG. 19 shows three fiber switches 250, again matching the three dual timing circuits shown in FIG. 17. Port 1801-1 connects to voltage regulator 1901, which, via a series of capacitors 1903, connects to the input of fiber switch 1902.

Figure 20:
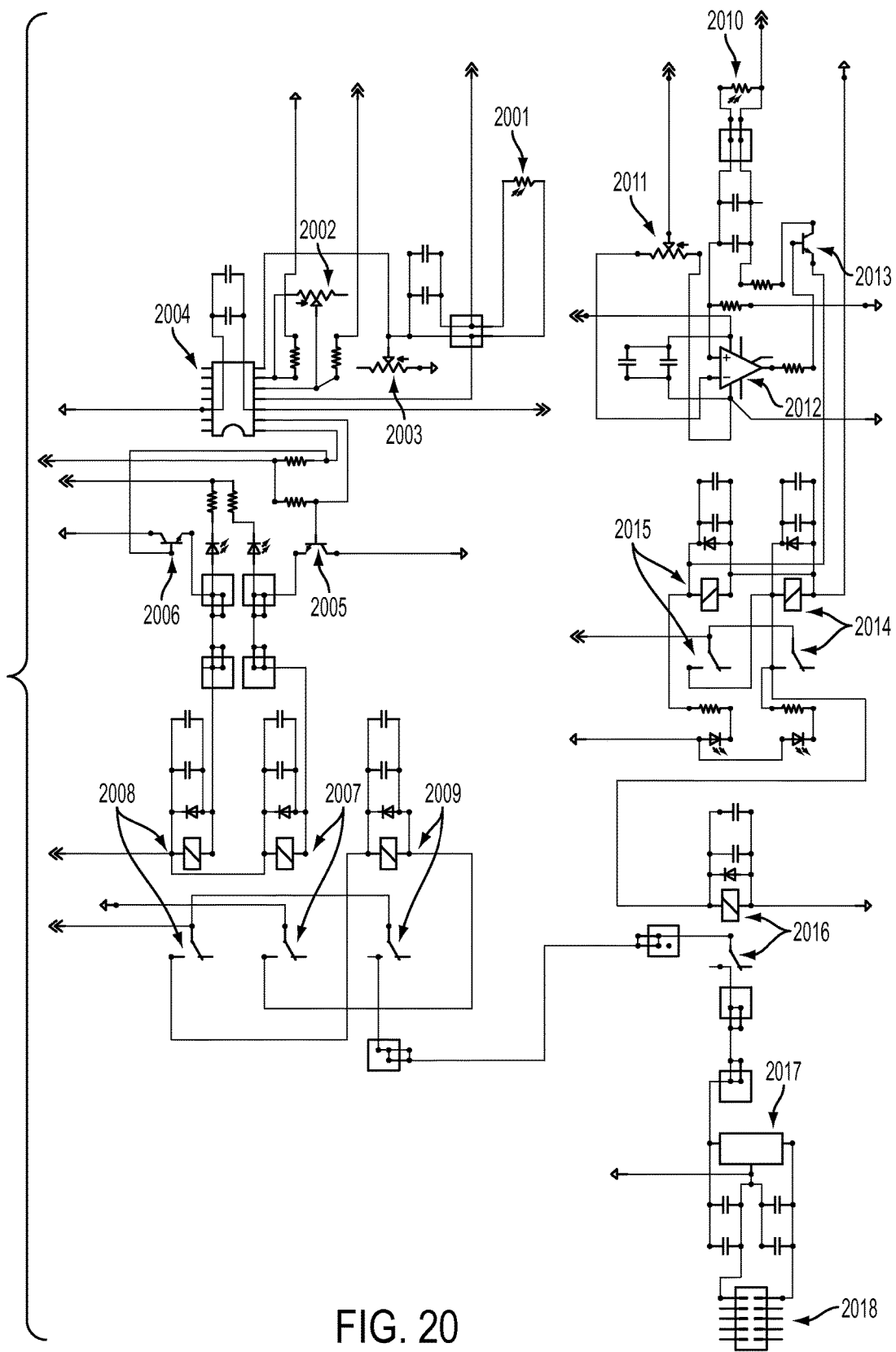
FIG. 20 shows a schematic describing a non-limiting exemplary embodiment of a single value logic unit.

An exemplary embodiment of a single value version of logic unit 300 is depicted in FIG. 20. It should be noted that FIG. 20 depicts substantially the same components as FIGS. 21 through 28, but allows for only one specific amplitude of light to be detected within main light containment area 302. Thus, FIG. 20 exists only to explain the general configuration of the logic unit, whereas FIGS. 21 through 28 are necessary to show a system capable of detecting more than one specific amplitude of light within main light containment area 302.

In FIG. 20, photoconductive cell 2001 is connected at least to trimmer 2003 and amplifier 2004. Trimmer 2003 is further connected to amplifier 2004. An additional trimmer 2002 is connected to a power rail via a resistor, and to amplifier 2004. Amplifier 2004 additionally connects to transistors 2005 and 2006, which in turn connect to relays 2007 and 2008 respectively, and to power/ground rails. Relays 2007 and 2008 connect to relay 2009, which in turn connect to relay 2016. Components 2001 through 2009 can be said to comprise a light amplitude sensing circuit 303. In another portion of FIG. 20, photoconductive cell 2010 connects at least to amplifier 2012. Amplifier 2012 is additionally connected at least to trimmer 2011 and transistor 2013, thereby driving the base of transistor 2013. Transistor 2013 serves as an intermediary between amplifier 2012 and relays 2014 and 2015. Relay 2015 is additionally connected to relay 2014. Relay 2014 is additionally connected to relay 2016. Components 2010 through 2015 can be said to comprise an output sensing circuit 305. In turn, relay 2016 connects to voltage regulator 2017, and voltage regulator 2017 connects to fiber switch 2018. Components 2016 through 2018 can be said to comprise a final output circuit 306.

Figure 21:
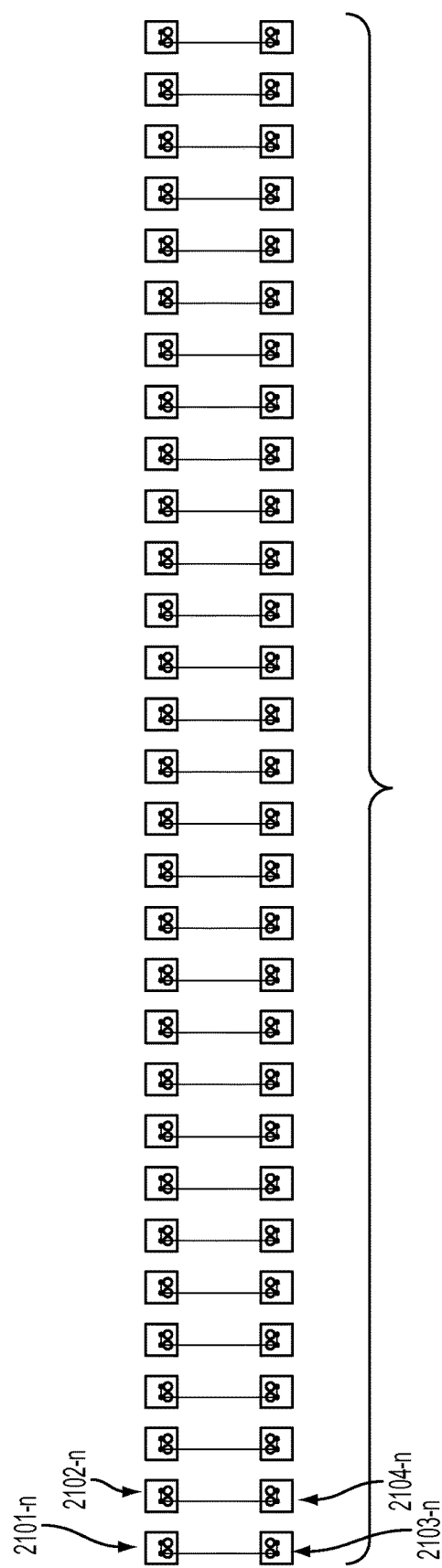
FIG. 21 shows a schematic describing electrical connections between FIGS. 23 and 25.
Figure 22:
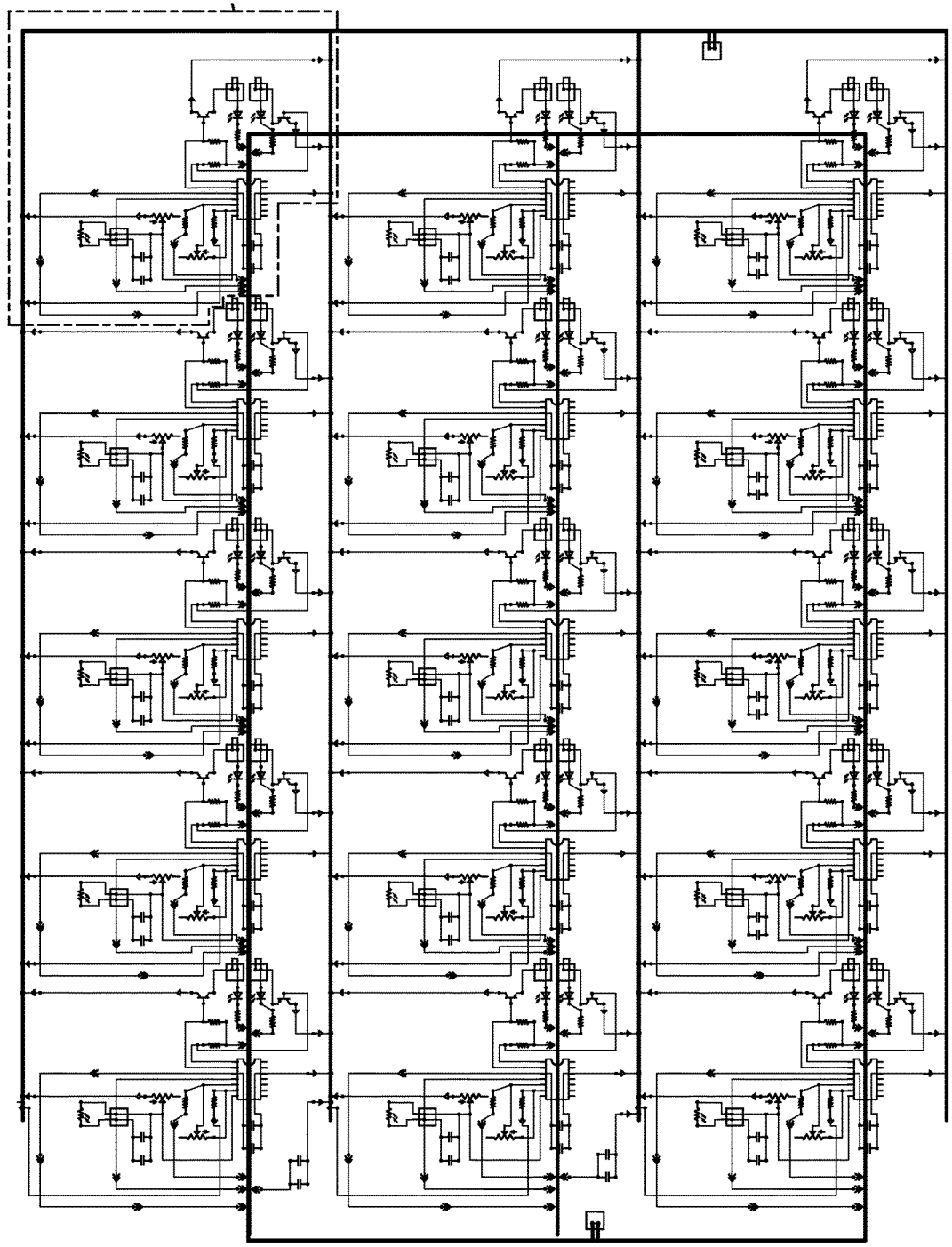
FIG. 22 shows a schematic describing a non-limiting exemplary embodiment of a plurality of components of the light amplitude sensing circuits of the logic unit.
Figure 23:
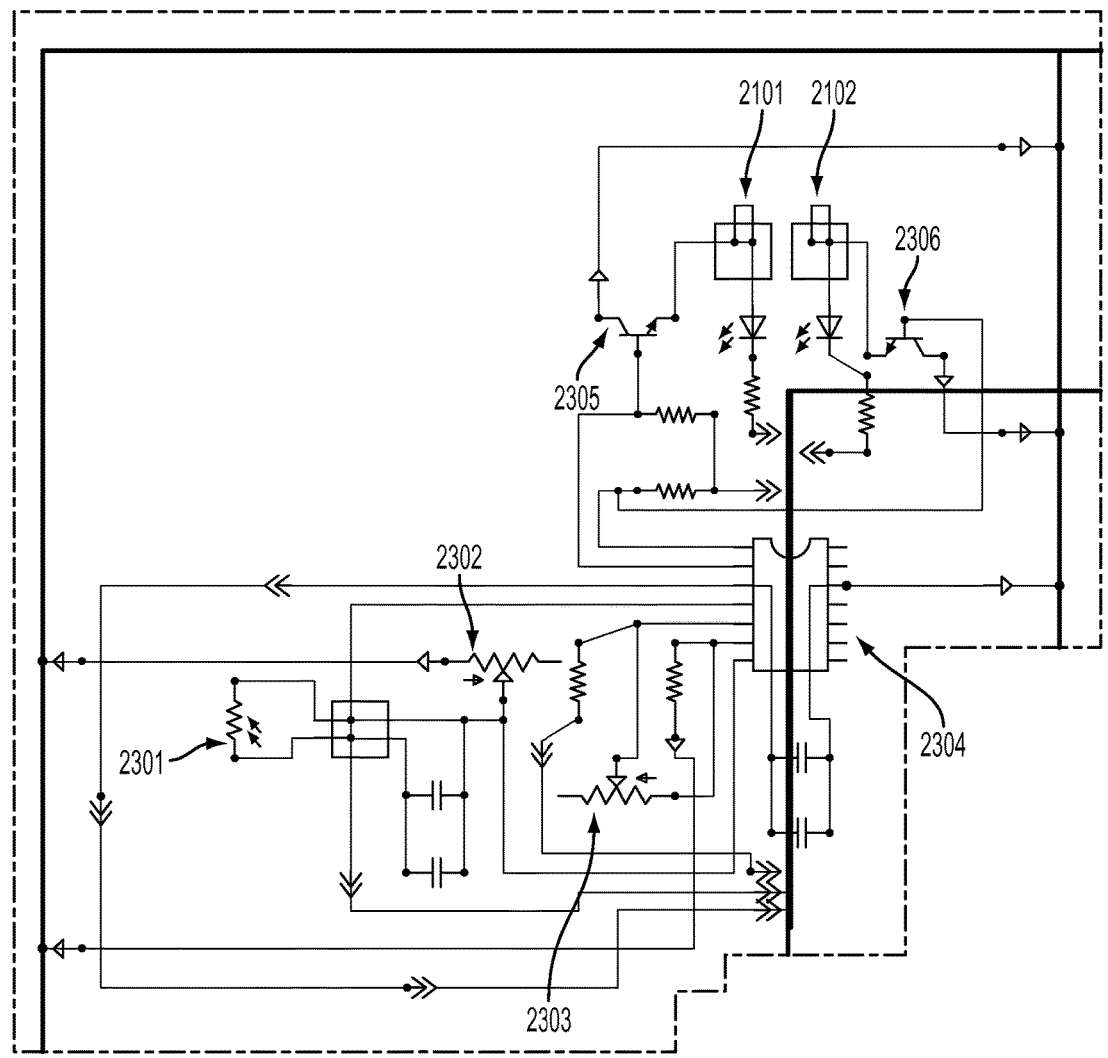
FIG. 23 shows a schematic describing a non-limiting exemplary embodiment of a subsection of a single light amplitude sensing circuit of the logic unit.

An exemplary embodiment of a the logic unit 300 unit is depicted in FIGS. 21 through 28. FIG. 21 shows a plurality of connections between ports 2101 and 2103, and between ports 2102 and 2104. FIG. 22 shows a plurality of components of the light amplitude sensing circuits of the logic unit. FIG. 23 shows a subsection of FIG. 22, depicting a portion of a single light amplitude sensing circuit 303. Photoconductive cell 2301 is connected at least to trimmer 2302 and amplifier 2304. Trimmer 2302 is further connected to amplifier 2304. An additional trimmer 2303 is connected to a power rail via a resistor and to amplifier 2304. Amplifier 2304 additionally connects to at least transistors 2305 and 2306, which in turn connect to ports 2102 and 2101 respectively.

Figure 24:
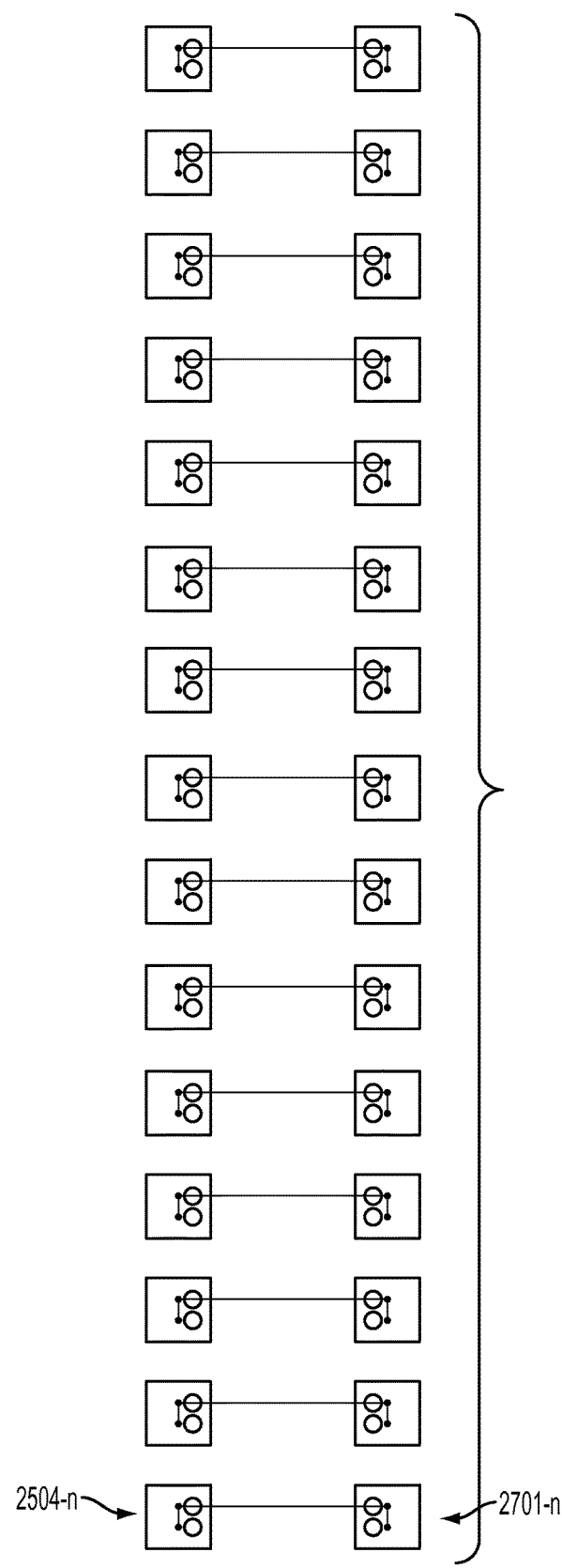
FIG. 24 shows a schematic describing electrical connections between FIGS. 25 and 27.
Figure 25:
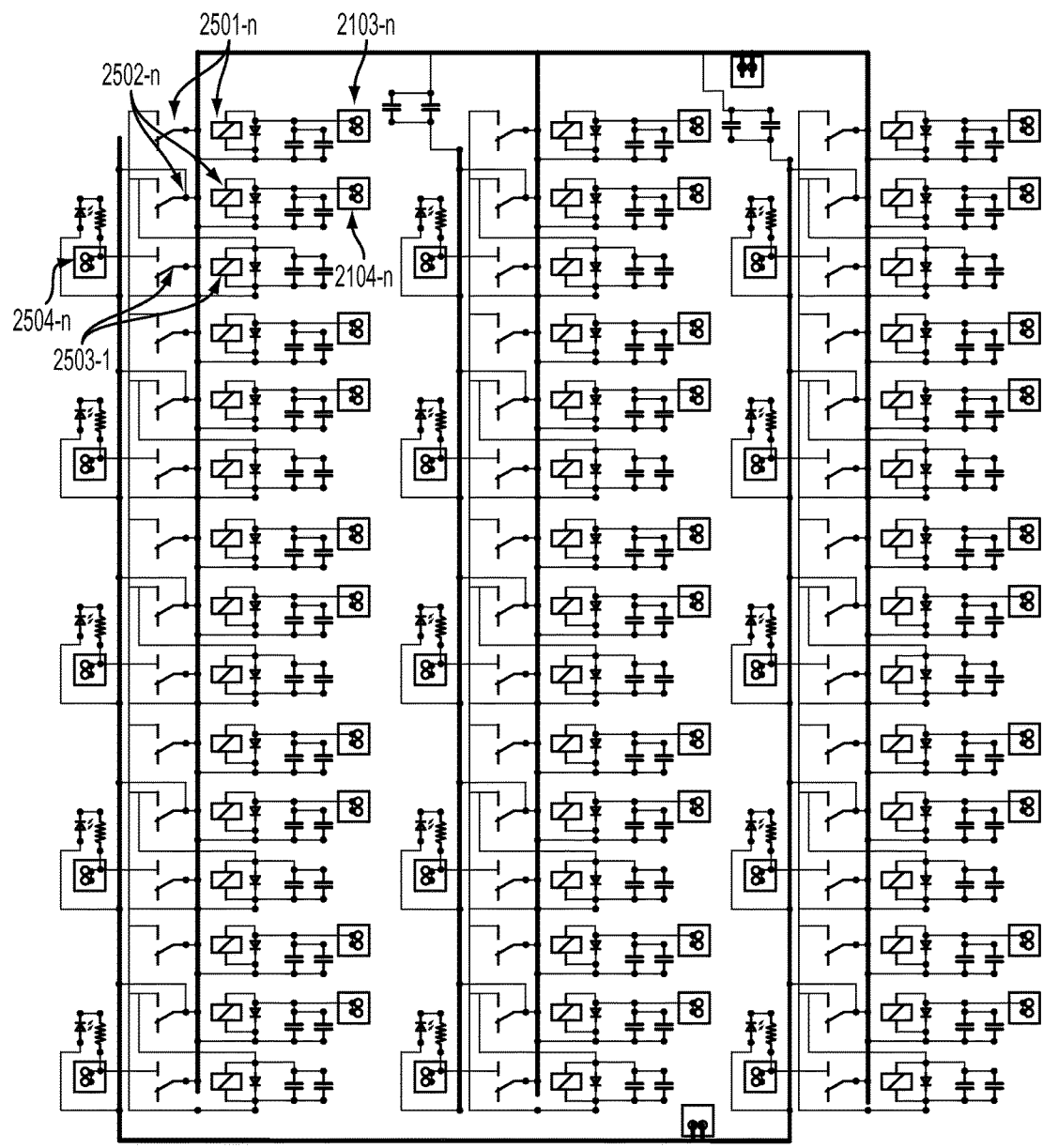
FIG. 25 shows a schematic describing a non-limiting exemplary embodiment of a plurality of further components of the light amplitude sensing circuits of the logic unit.
Figure 26:
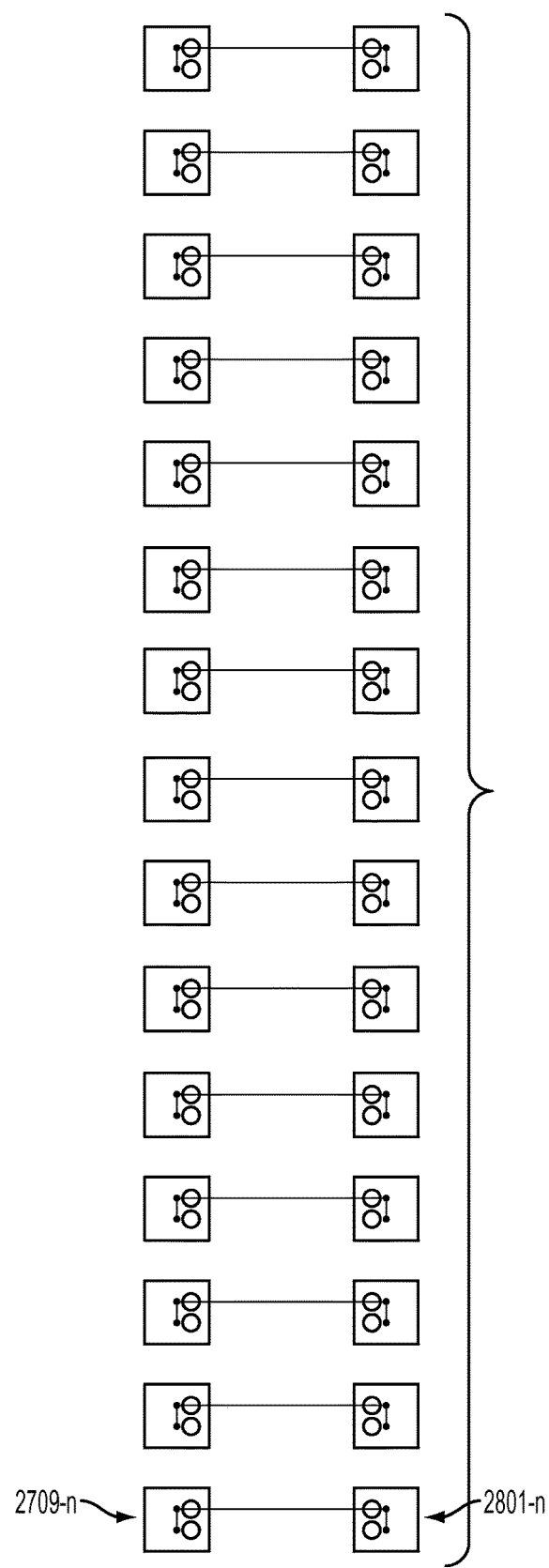
FIG. 26 shows a schematic describing electrical connections between FIGS. 27 and 28.

FIG. 25 depicts a plurality of further components of the light amplitude sensing circuits 303 of the logic unit 300. Ports 2103 and 2104 connect to relays 2501 and 2502. These relays are in turn connected to relay 2503, which itself is connected to port 2504. FIG. 24 shows a plurality of connections between ports 2501 and 2701.

Figure 27:
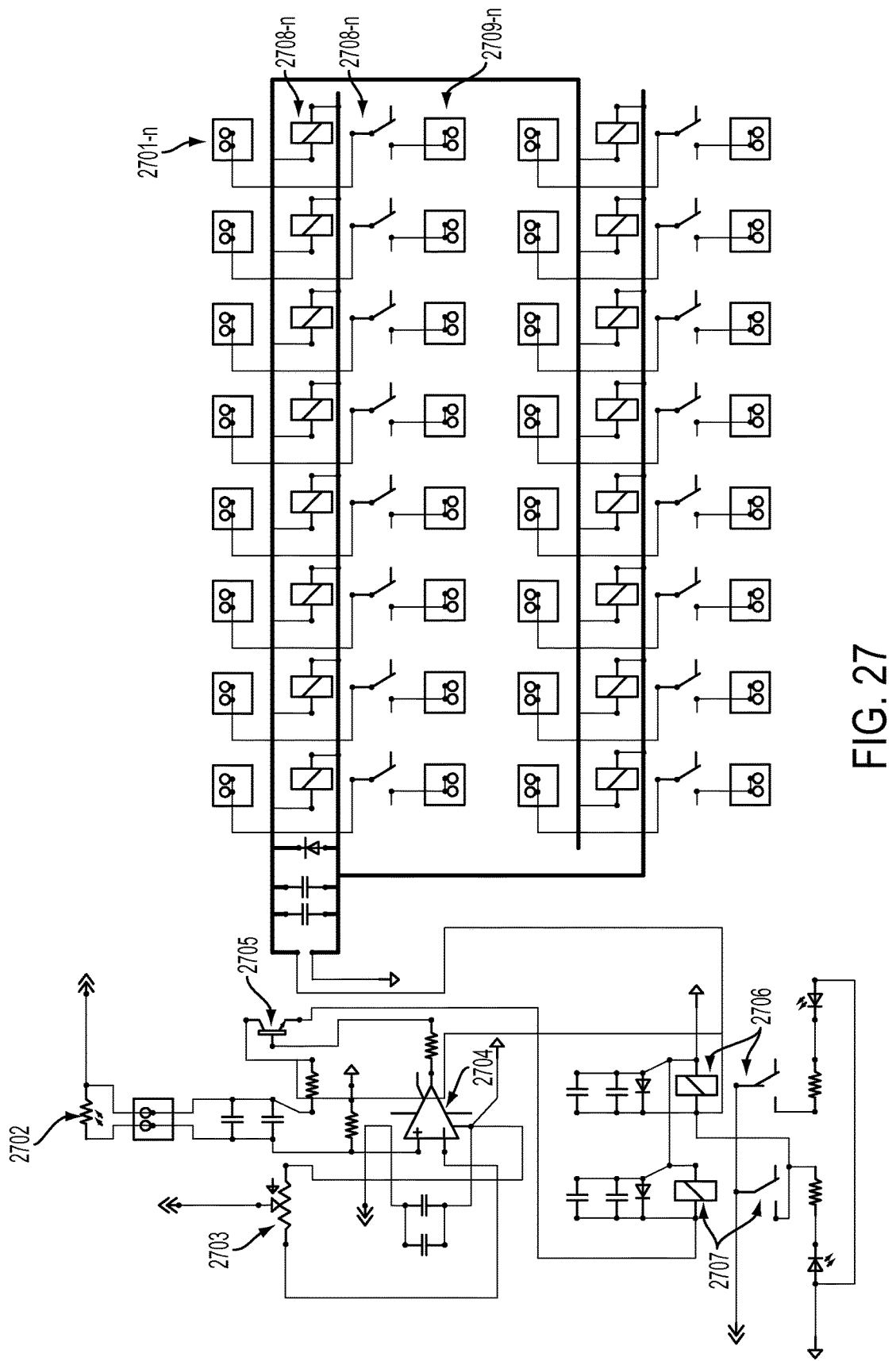
FIG. 27 shows a schematic describing a non-limiting exemplary embodiment of components of the output sensing circuit and final output circuit of the logic unit.

FIG. 27 shows components of the output sensing circuit and final output circuit of the logic unit 300. Port 2701 connects to relay 2708, which in turn connects to port 2709. In another portion of FIG. 27, photoconductive cell 2702 connects to at least amplifier 2704. Amplifier 2704 is additionally connected to at least trimmer 2703 and transistor 2705, thereby driving the base of transistor 2705. Transistor 2705 serves as an intermediary between amplifier 2704 and relays 2706 and 2707. Relay 2707 is additionally connected to relay 2706. Relay 2706 is additionally connected to relays 2708.

Figure 28:
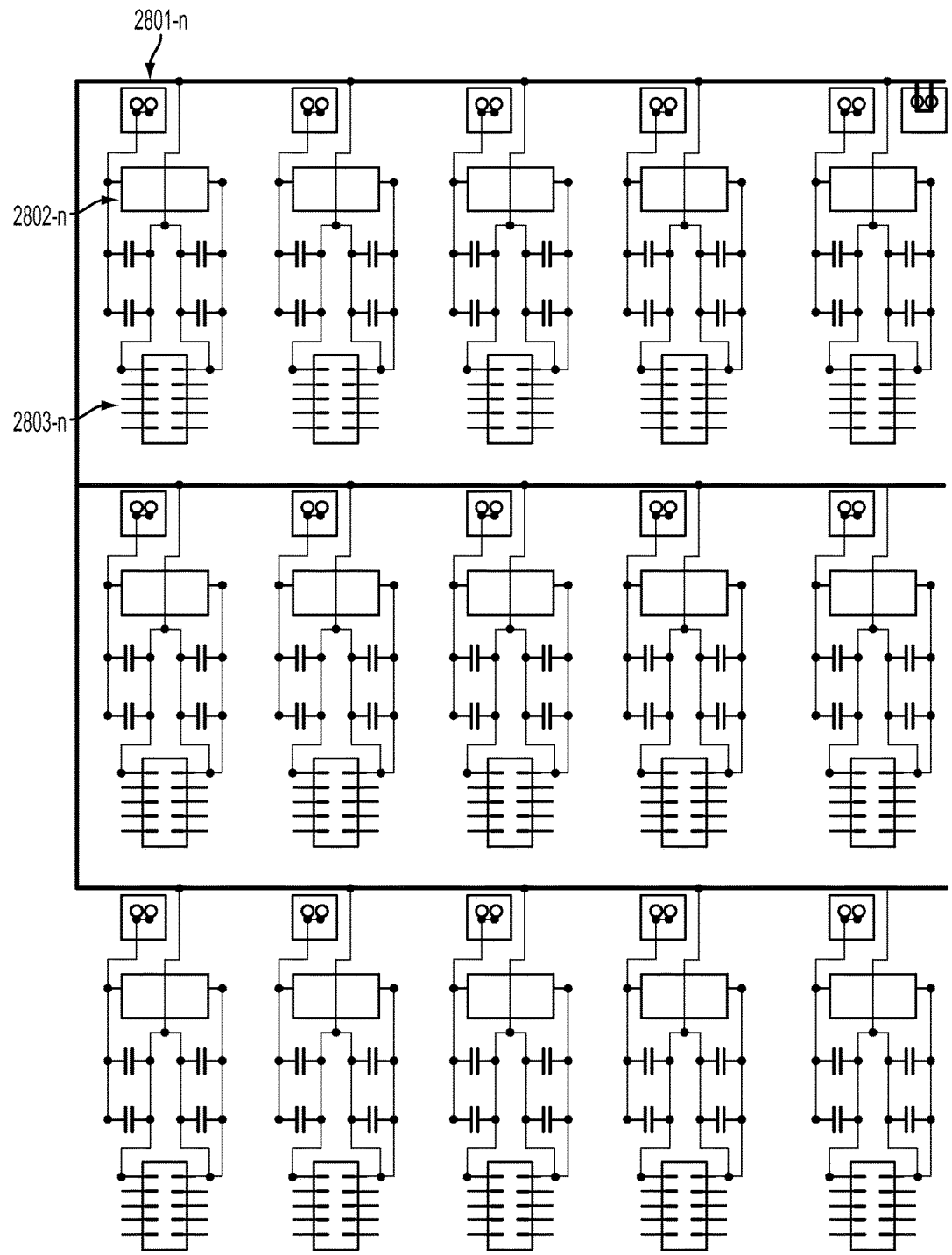
FIG. 28 shows a schematic describing a non-limiting exemplary embodiment of components of the final output circuit of the logic unit.
Figure 29:
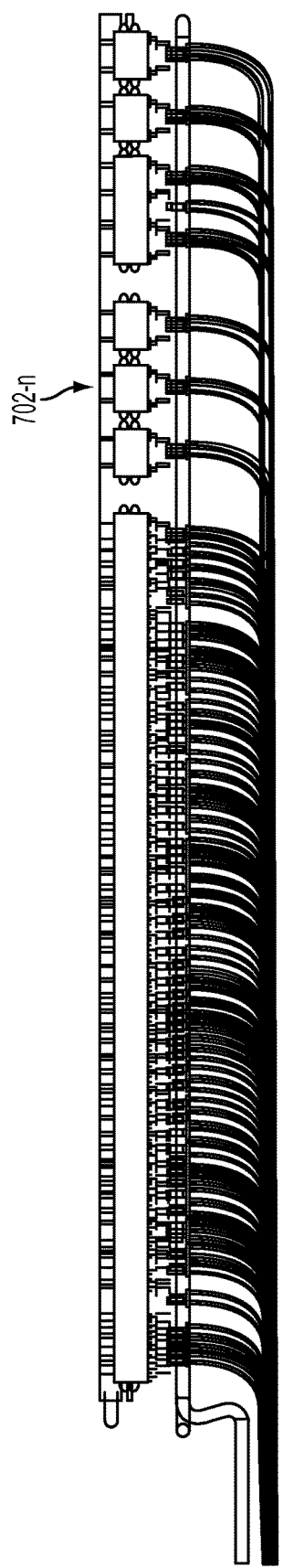
FIG. 29 shows a drawing of a non-limiting exemplary embodiment of a user input device viewed from the front.
Figure 30:
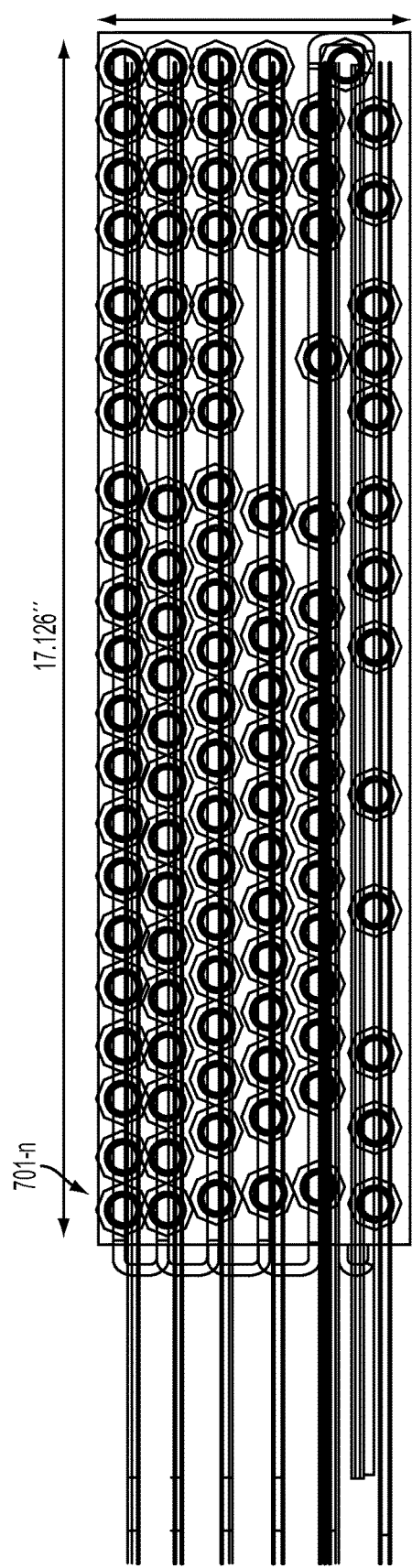
FIG. 30 shows a drawing of a non-limiting exemplary embodiment of a user input device viewed from above.
Figure 31:
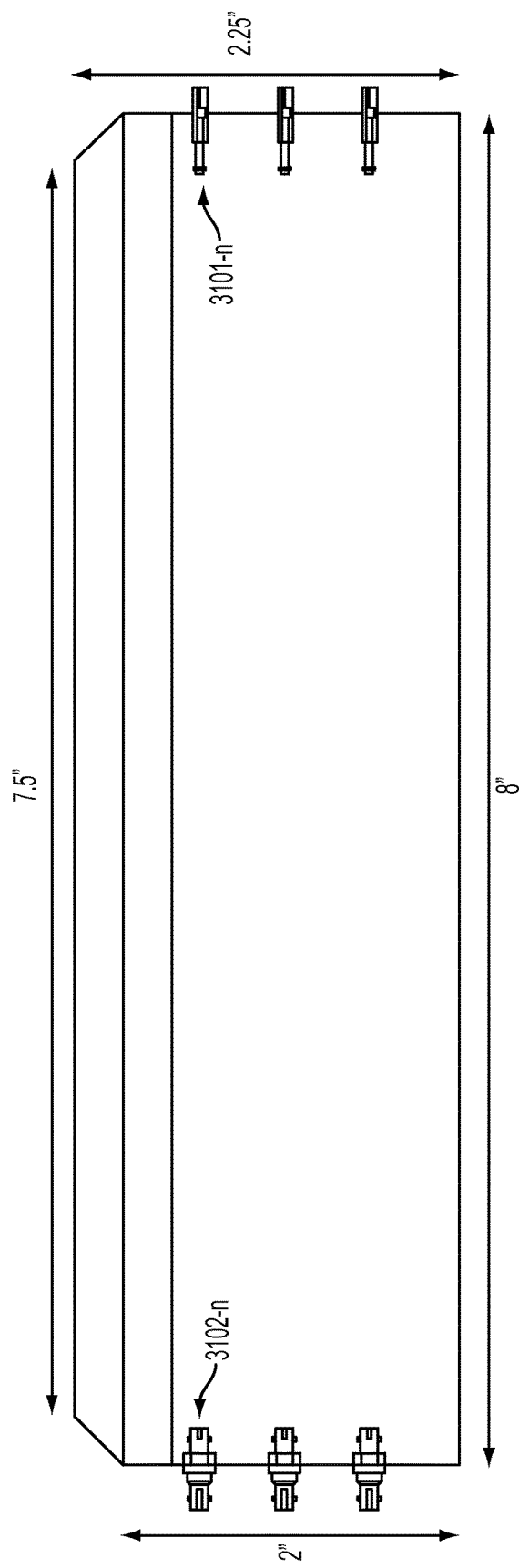
FIG. 31 shows a drawing of a non-limiting exemplary embodiment of a main light containment area viewed from the left.
Figure 32:
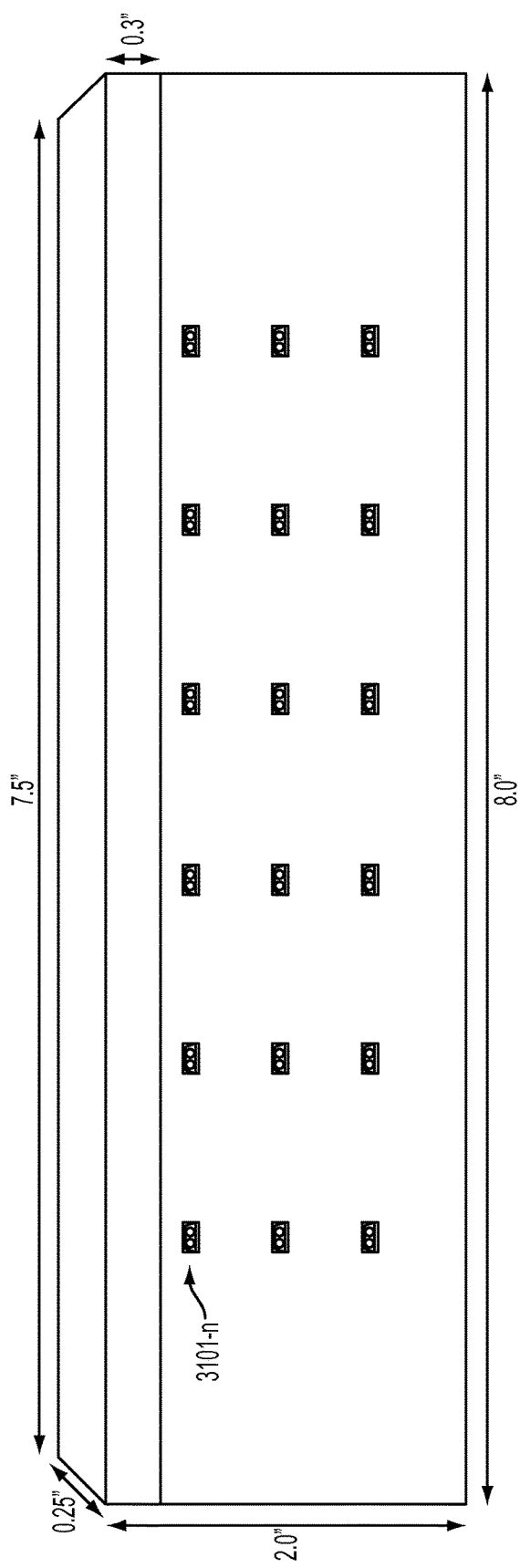
FIG. 32 shows a drawing of a non-limiting exemplary embodiment of a main light containment area viewed from the front.
Figure 33:
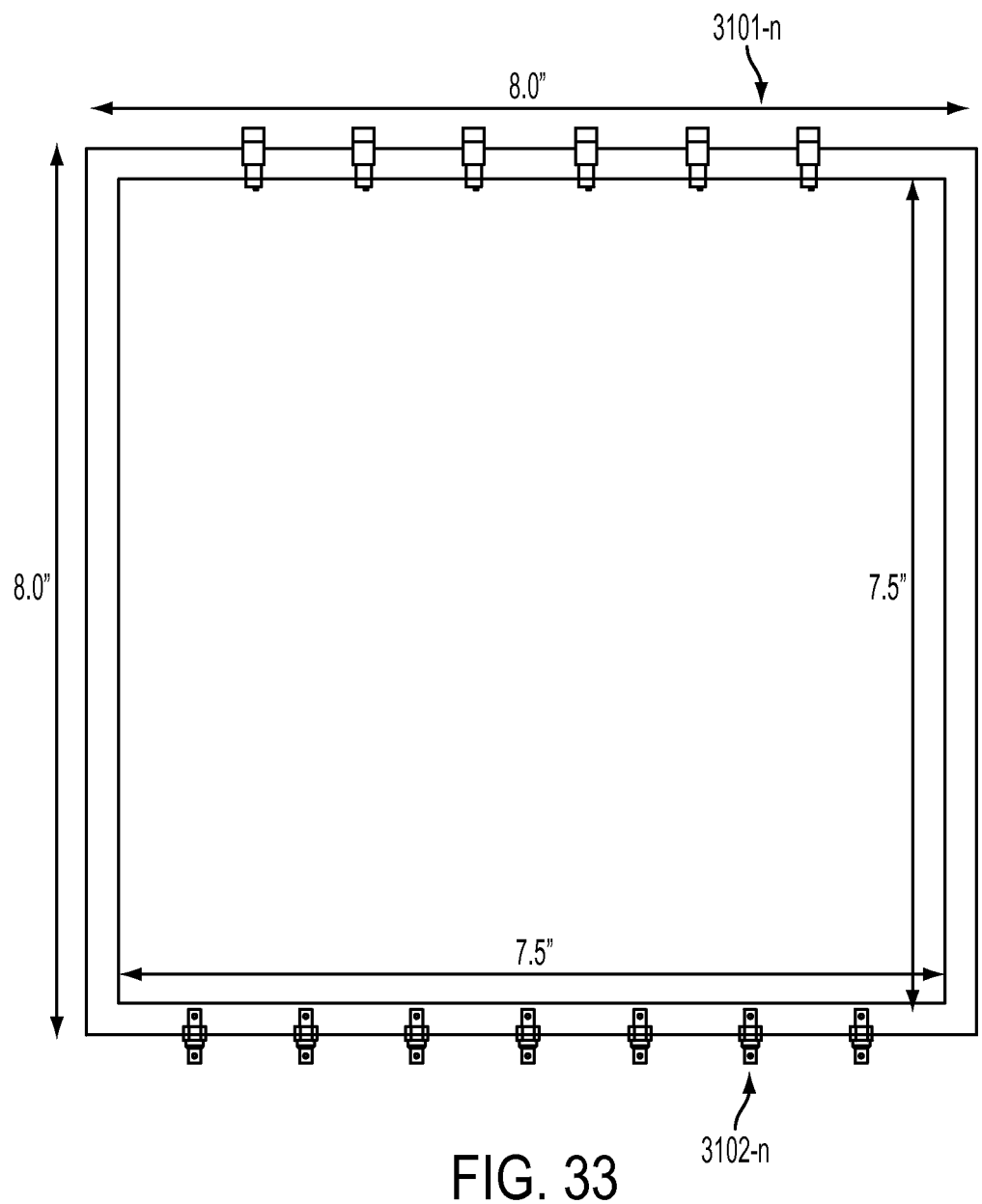
FIG. 33 shows a drawing of a non-limiting exemplary embodiment of a main light containment area viewed from below.
Figure 34:
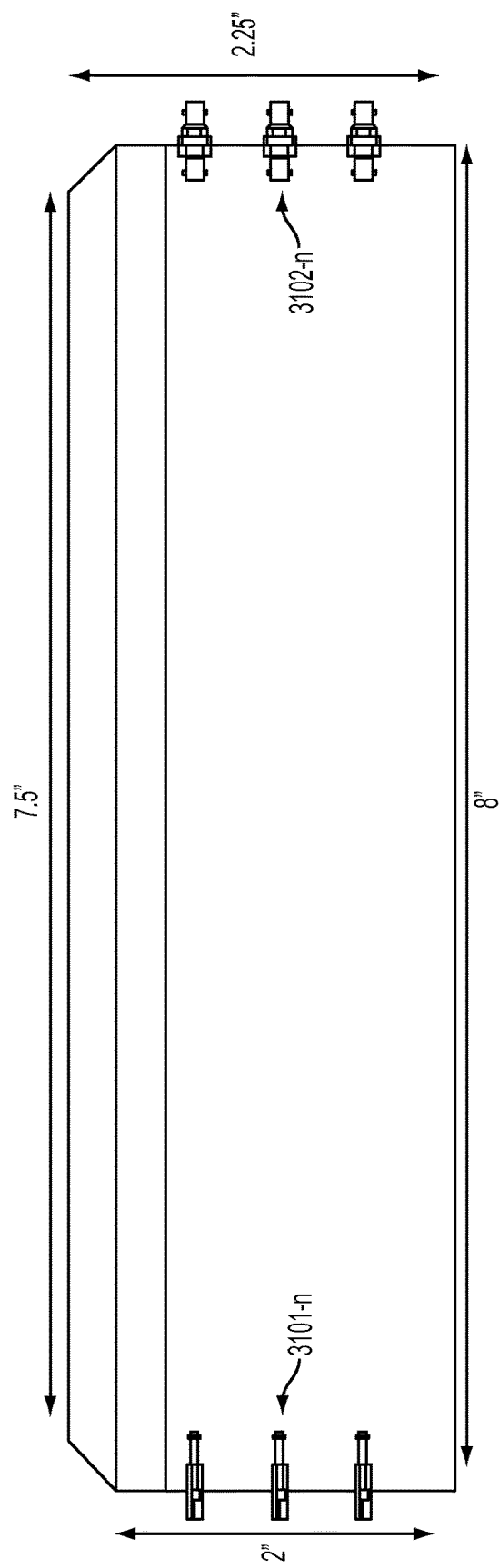
FIG. 34 shows a drawing of a non-limiting exemplary embodiment of a main light containment area viewed from the right.
Figure 35:
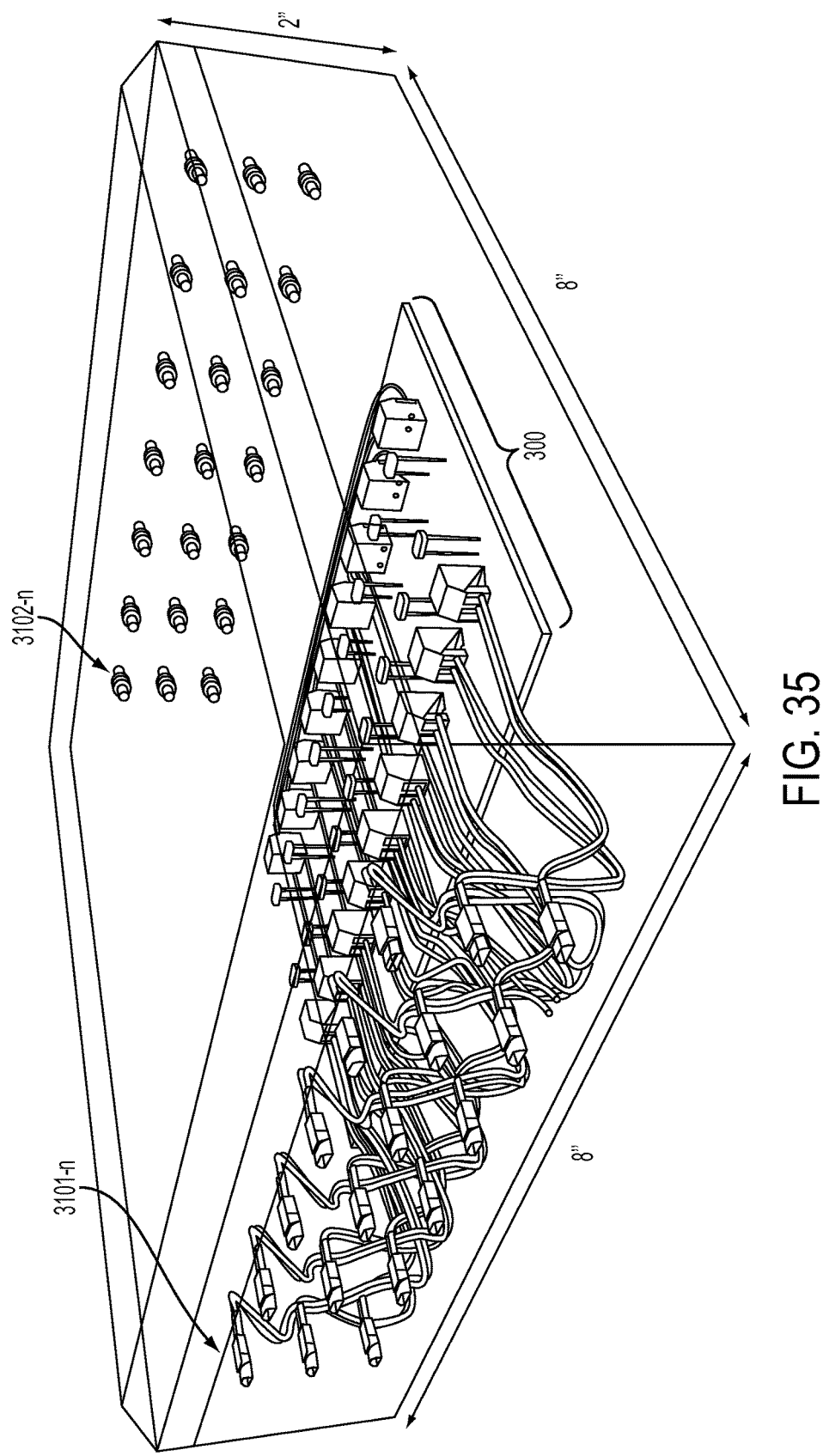
FIG. 35 shows a drawing of a non-limiting exemplary embodiment of a main light containment area viewed in perspective.
Figure 36:
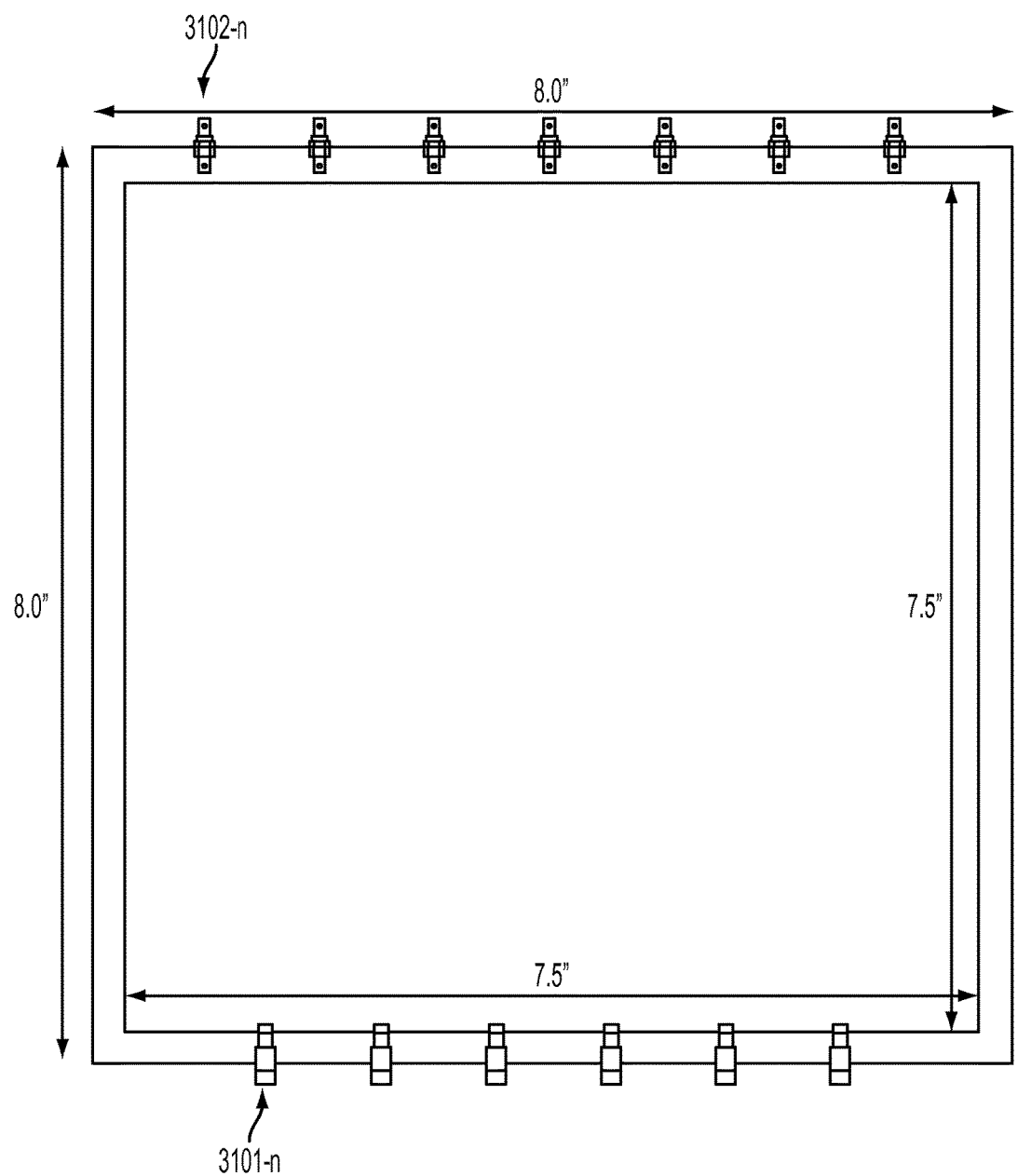
FIG. 36 shows a drawing of a non-limiting exemplary embodiment of a main light containment area viewed from above.
Figure 37:
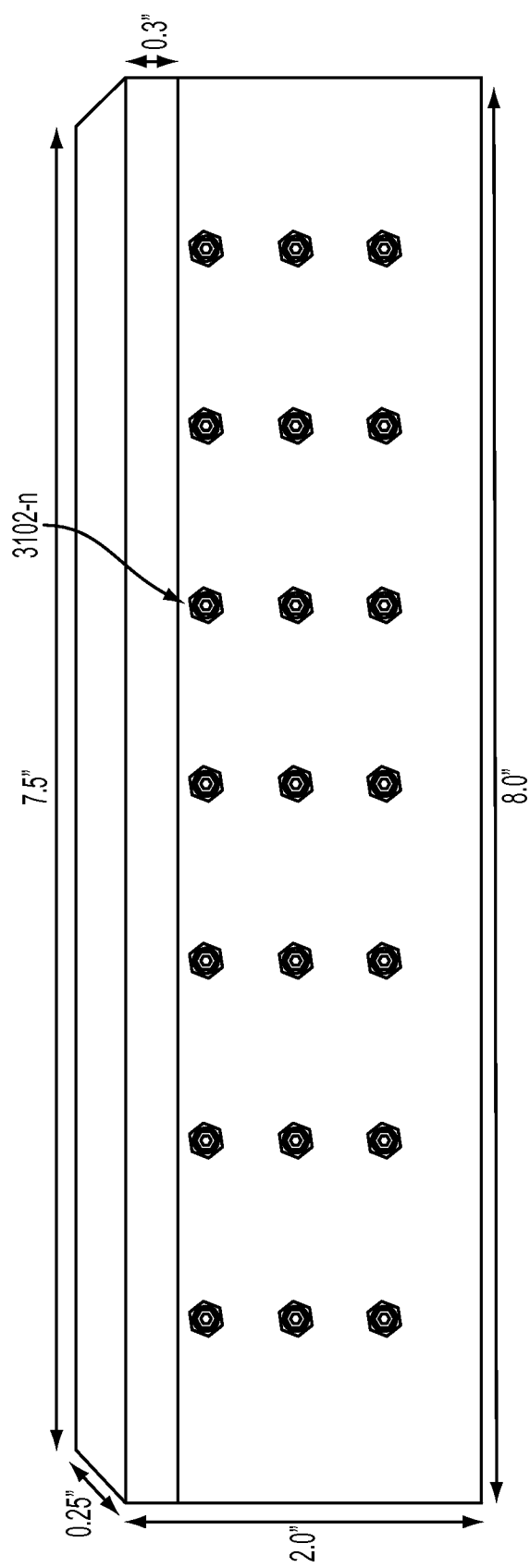
FIG. 37 shows a drawing of a non-limiting exemplary embodiment of a main light containment area viewed from the back.
Figure 38:
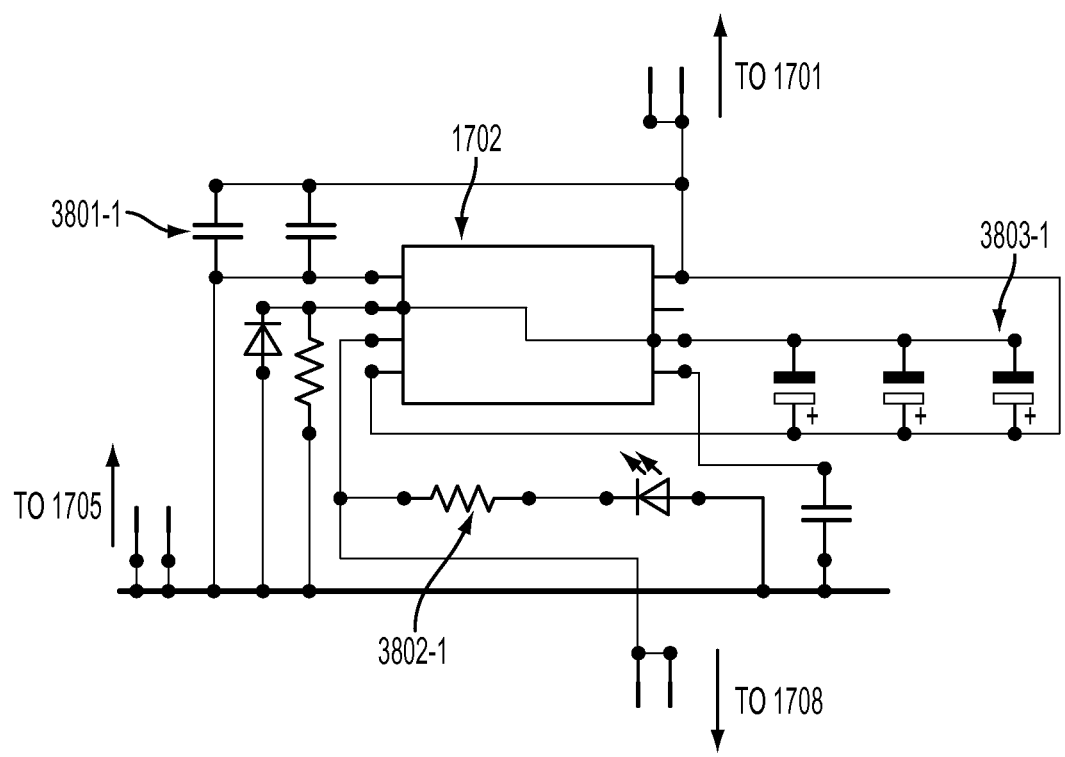
FIG. 38 shows a schematic describing a non-limiting exemplary embodiment of a "delay-on" subsection of the fiber switch timing circuit.
Figure 39:
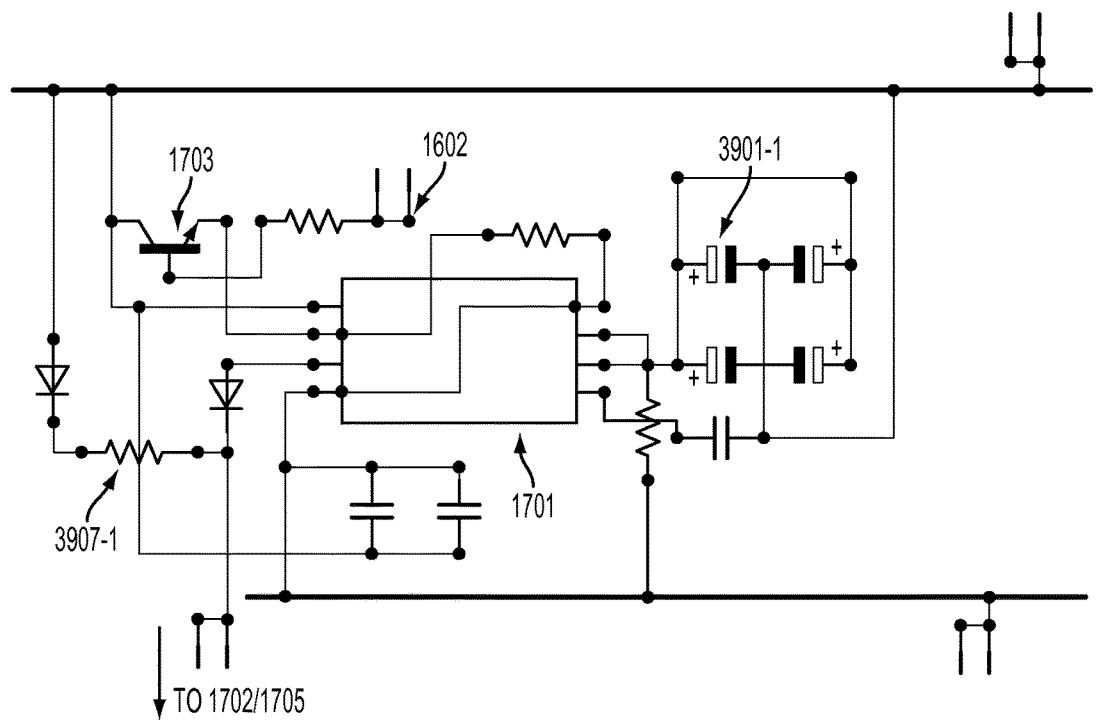
FIG. 39 shows a schematic describing a non-limiting exemplary embodiment of a "delay-off" subsection of the fiber switch timing circuit.

FIG. 28 shows components comprising an embodiment of the final output circuit 306 of the logic unit 300. Port 2801 connects to at least voltage regulator 2802, which in turn connects to fiber switch 2803. Fiber switch 2803 marks the physical conclusion of the current embodiment.

A discussion of an example operation of the system according to the first exemplary embodiment is now presented herein.

Referring to the user input device schematic in FIG. 6, it is assumed that a signal is inputted to one of the pushbutton switches 701, specifically the pushbutton switch shown in FIG. 7, labeled 701. Pushbutton switch 701 sends an electrical signal to the center pin of relay 703, causing it to change states. It is important to note that relay 703, like many other relays mentioned herein, is configured in conjunction with a diode and a pair of capacitors in order to ensure a predictable electrical response. Signal progression continues as relay 703 switches state due to the incident electrical signal now present at its center pin, and allows signal flow through port 702.

A simplified representation of this process can be seen in FIG. 8, wherein pushbutton switch 701-n is connected directly to port 702-n. As before, the "-n" suffix denotes that multiple instances of a component exist, corresponding to multiple user commands. FIG. 9 shows another representation of the plurality of relays depicted in FIG. 6. In FIG. 10, a single relay is depicted, much as in FIG. 7. To reiterate, pushbutton switch 701 triggers a state change in relay 703, thus changing a signal path from port 1001 to port 1002. Ports 1001 and 1002 are not shown in FIG. 7, but exist between relay 703 and port 702.

FIG. 11 offers another representation of the aforementioned switching behavior, showing a direct connation from relay 703, via ports 1001 and 1002, to port 702 Ports 1001 and 1002 may serve as intermediaries between relay 703 and port 702. Following the change of state in relay 703, port 702 allows signal flow to voltage regulator 1201 (see FIG. 12) and capacitors 1203, which serve to ensure a smooth and predictable electrical signal is delivered to fiber switch 1202. Upon receiving an electrical signal at its input, fiber switch 1202 releases a momentary light beam, which is transmitted via a fiber-optic link to a light containment area 210 of the light attenuation unit 200.

A light containment area 210 receives the momentary light beam transmitted from fiber switch 1202. As seen in FIG. 15, a photoconductive cell 1501 within a light containment area 210 is capable of detecting the presence of a momentary light beam. 6 light containment areas 210 are shown here, but is important to note that every possible input of the user-input device (i.e. each pushbutton switch) will have a corresponding light containment area 210, the number thereof not necessarily being equal to six. As previously mentioned, the light attenuation unit 200 converts momentary light beams are into persistent light beams for combination and valuing within logic unit 300.

Upon detecting the presence of a momentary light beam within an associated light containment area 210, the resistance of the photoconductive cell 1501 drops, thereby allowing current to flow across the device. As seen in FIGS. 14 and 13, current flowing across photoconductive cell 1501 originates from and returns to port 1301. A change in current flow at the input of amplifier 1303 (see FIG. 13) triggers an electrical response from amplifier 1303 to port 1304. Amplifier 1303 is configured to produce a desired output utilizing a plurality of resistors and capacitors. Trimmer 1302 allows for an adjustment in sensitivity, such that a momentary light beam of greater or lesser amplitude may be required in order to trigger a response from amplifier 1303. Additionally, LED 1305 is configured to indicate that a detection event has occurred. The electrical response created by amplifier 1303 is transmitted through port 1304 to relay 1603, shown in FIG. 16.

Each relay 1603 operates in a manner similar to that discussed previously; each relay 1603 corresponds to one possible input, and upon receiving an electrical response from port 1304 as mentioned above, the state of the relay changes to allow signal flow from a power rail to port 1602 via a resistor and LED 1601, the LED denoting that the relay has been activated.

Port 1602 connects to transistors 1703-1, 1703-2, and 1703-3 in FIG. 17 (a fiber switch timing circuit 200 (FSTC 200)). One FSTC 200 exists corresponding to each relay 1603, thus, in this exemplary embodiment, six instances of FSTC 200 exist, but the discussion thereof will be limited to only the instance associated with the relay 1603 which has received an electrical response. All instances of FSTC 200 are substantially similar in their configuration.

Upon receiving an electrical response from port 1602 at its base, transistor 1703-1 allows signal flow from a power rail to timer 1701-1 for the duration of the electrical response originating from port 1603. This differs from the operation of transistors 1703-2 and 1703-3 in that the signal paths from a power rail to timers 1701-2 and 1701-3 opened thereby feature the additional transistors 1704-1 and 1704-2, respectively.

Timer 1701-1 works in conjunction with timer 1702-1 and a plurality of capacitors and resistors to introduce a noticeable delay to the flow of operations with the light attenuation unit 200. It is noted that this combination of elements corresponds to an instance of element 2410 of FIG. 4. The impedance values of the capacitors and resistors associated with timer 1701-1 may be altered as necessary to produce a predetermined "delay-off" time (i.e. the duration of a signal transmission from timer 1701-1). Upon receiving input via transistor 1703-1, timer 1701-1 provides an electrical signal to timer 1702-1 and to relay 1705-1 for a predetermined period of time. This period is generally less than one second in length. Upon changing state, relay 1705-1 allows signal flow through port 1701-1, and additionally causes relay 1706-1 to change state. Relay 1706-1 is configured in the manner of a seal-in circuit, meaning that once it changes from a nonconductive state to a conductive state, it retains its state until a system wide power cycle event occurs. Additionally, upon receiving input from timer 1701-1, timer 1702-1 induces a short delay (i.e. less than one second) before providing an output to relay 1708-1. Much as the delay in shutoff regarding timer 1701-1, the delay in activation regarding timer 1702-1 can be altered as necessary to produce a predetermined "delay-on" time via its associated capacitors and resistors. This operation occurs simultaneously with the change of state of relays 1705-1 and 1706-1.

The operation of a seal in circuit is described as follows with respect to relay 1706-1. When relay 1705 allows a signal to flow to relay 1706-1, the state of relay 1706-1 changes. When the state of relay 1706-1 changes, an electrical signal is fed back to relay 1706-1, thus forming a cyclic path. In short, when relay 1706-1 receives a momentary signal from relay 1705-1, it maintains this signal through a feedback (or seal in) circuit. Also connected across relay 1706-1 is a diode, these diodes prevent reverse current flow, much as in other relays mentioned herein. Connected in the same fashion are two capacitors which ensure that the signal is free of ripples and spikes. Once relay 1706-1 is triggered and its state thus persistently changed, it will send a positive signal to relay 1708-1 until such time as a system wide power cycle event occurs. All other seal in circuits mentioned herein function in an equivalent manner.

Upon changing state, relay 1708-1 subsequently causes relay 1709-1 to change state. Much as relay 1706-1, relay 1709-1 is configured in the manner of a seal-in circuit, in the same fashion as that of relay 1706-1. The plurality of components described above regarding a "delay-off" and "delay-on" operation can be said to constitute a dual timing circuit 240.

The result of these combined operations is that port 1707-1, fed by relay 1706-1, provides an electrical signal after a single detection of a momentary light signal by an associated photoconductive cell 1501. Additionally, now "sealed-in" relay 1709-1 provides an electrical signal to the base of transistor 1704-1, thus opening an electrical path from a power rail to the source pin of transistor 1703-2, and ultimately to the input of timer 1701-2, in the case that the base of transistor 1703-2 is being driven by port 1602.

At this point in the operation of the FSTC 240, a single instance of a particular user command (i.e. pushbutton switch 701 input, and accordingly momentary light beam detection via photoconductive cell 1501) has been recorded. Additionally, a delay of approximately 790 milliseconds has been induced (other delay durations are possible), during which no additional instances of this particular user command will be recorded. Recordation of a second instance of the same user command only becomes possible once the base of transistor 1704-1 is being driven by relay 1709-1. Thus, a user holding down a pushbutton switch 701 for too long a time period or pressing a pushbutton switch 701 too rapidly in succession will not cause recordation of more than the intended number of instances of a particular value.

Once persistent driving of transistor 1704-1's base has been achieved, the operation of timers 1701-2 and 1702-2 is identical to that of timers 1701-1 and 1702-1, in that the FSTC 240 is ready to receive another instance of the same user input.

Were a second instance of the same signal to be inputted, either because the pushbutton switch 701 associated with the signal was not released within 790 milliseconds, or because it was once again depressed at a later time, the next set of timers 1701-2 and 1702-2 would record the presence of the signal and subsequently open a signal path to timers 1701-3 and 1702-3 without changing the state of the relays 1706-1 and 1709-1. Thus, the FSTC allows for persistent recordation of multiple instances of a single user command.

Following recordation of a user command, the associated port 1701 sends a signal to fiber switch 1902 via voltage regulator 1901 (see FIG. 19), which in turn releases an un-attenuated light beam to a light attenuation device (not shown) which has been pre-tuned to attenuate the un-attenuated light beam to a specific light amplitude corresponding to the pushbutton 701 depressed by the user. In this way, a light beam of specific amplitude is produced and ready to be sent to the logic unit.

FIG. 20 shows a single value logic unit 300. It is important to note that the progression herein is very similar to that which occurs in FIGS. 21 through 28, the difference being that in this exemplary embodiment, only one light beam may enter the main light containment area 302, the amplitude of the input is already known, and no combination of light beams takes place; whereas the embodiment shown in FIGS. 21 through 28 describe a system capable of detecting different amplitude of light and relating multiple light beams. This exemplary embodiment (FIG. 20) is akin to performing an arithmetic operation of "1+0=1"; the outcome is always known to be the same, thus only one light amplitude sensing circuit 303 is required, greatly reducing the necessary number of components, and simplifying the explanation. Additionally, it is important to note that FIG. 23 exists only for explanatory purposes; the exemplary embodiment as described by FIGS. 21 through 28 function in the same fashion, but feature many instances of the same hardware necessary to build an effective and useful apparatus. As such, FIGS. 21 through 28 are referred to throughout the discussion to indicate their relation to FIG. 20.

A fiber input port 301 of the logic unit 300 receives the attenuated light beam from the light attenuation unit 200 and routes the attenuated light beam to main light containment area 302. A sensor 2001, as seen in FIG. 20 is mounted within main light containment area 302 (see FIGS. 31 through 37 for a physical description thereof). This sensor, comprised of a photoconductive cell or the like, is configured to detect a specific light amplitude. In this embodiment, sensor 2001 is a 1 MΩ photoconductive cell, but sensor 2001 is not limited to this configuration. Depending on the desired configuration, sensors of a different design and or impedance may be used.

Upon arrival of the attenuated light beam in main light containment area 302, the aforementioned sensor 2001 detects the light beam. For the purposes of explanation, it is assumed herein that the amplitude of the attenuated light beam can be measured at an amplitude of 25 milliwatts, and corresponds to a logical or numerical value of 1. The apparatus as described is capable of making this determination; this information is assumed for the purposes of explanation only. As the attenuated light beam becomes incident upon the sensor, the resistance of the sensor drops from 1 MΩ, at absolute darkness, to some lesser value. In this case, the attenuated light beam is equivalent to the related light beam, as it is the only input to the main light containment area 302.

Current is thus allowed to pass through the sensor. Accordingly, a signal flows out of the light containment area to the remainder of light amplitude sensing circuit 301 (see FIG. 25 for a view of multiple light amplitude sensing circuits implemented on a single board). Sensor 2001 is connected to trimmer 2003, and to pin 4 of amplifier 2004. There is a second trimmer 2002 connected to pins 5 and 6 of amplifier 2004. Trimmers 2003 and 2004 allow for adjustment of a high and low electrical threshold. Pins 3 and 13 are connected to bypass capacitors. These bypass capacitors help in preventing false triggering by providing the circuit a cleaner and more stable voltage by reducing spikes and ripples within the circuit. The combination of sensor 2004, trimmers 2003 and 2002, amplifier 2004, and its associated resistors and capacitors is referred to as a window comparator. By defining a high and a low threshold, a specific window comparator is defined. Threshold values very close to the amplitude of light to be detected can be chosen such that the window comparator only detects the intended light amplitude (i.e. the amplitude of a light beam or total amplitude of a relation of light beams). In this way, light sensor 2001 can be used to detect only specific amplitudes of light.

In this exemplary embodiment, threshold values are defined to detect an amplitude of 25 milliwatts (logical value 1) by manually adjusting trimmer 2003 to 5.8 KΩ, and trimmer 2002 to 6.0 KΩ. As a light amplitude of 25 milliwatts becomes incident upon light sensor 2001, the resistance of the sensor drops, thus allowing voltage across the sensor to rise, ultimately meeting the threshold conditions of the window comparator, and triggering an output from amplifier 2004. Upon triggering an output, amplifier 2004 produces two signals: a "high" signal from pin 2, and a "low" signal from pin 1. Pins 1 and 2 are both connected to a power rail via a series of resistors. Pins 1 and Pin 2 of amplifier 2004 are also connected to transistors 2006 and 2005 respectively.

When the aforementioned threshold conditions are met, an output from pins 1 and 2 of amplifier 2004 is triggered, which in turn drives the base of transistors 2005 and 2006 which themselves open a path from a ground rail to relay 2007 and relay 2008, respectively. In a multi-input system, signal flow would move to FIG. 27 (output sensing circuit 305) at this juncture. Relay 2008 corresponds to a low signal, and relay 2007 corresponds to a high signal. Driving of the base of transistors 2005 and 2006 is visually indicated by way of two LEDs, each connected to one of transistors 2005 and 2006 which are lit when each respective threshold condition is satisfied.

As the flow of progression continues in FIG. 20, the signal from the drain of transistor 2006 flows to pin 1 of relay 2008, and the signal from the drain of transistor 2005 flows to pin 1 of relay 2007. Both relay 2007 and 2008 are additionally connected to a power rail. Also across pins 1 and 2 of relays 2007 and 2008, there are respectively two diodes, and 4 capacitors. The diodes prevent current backflow, and the capacitors serve to smooth out voltage spikes and ripples. Upon receiving electrical signals from transistors 2006 and 2005 respectively, relays 2008 and 2007 switch states, thereby allowing signal flow through the relays. Relay 2007 is connected to a ground rail on its center pin, and relay 2008 is similarly connected to a power rail. When relays 2007 and 2008 change state, a path from the ground rail to the pin of relay 2007 connected to relay 2009 is opened, and a path from the pin of relay 2008 connected to relay 2009 is opened to a ground rail.

Relay 2009 is connected to a pair of capacitors and a diode; for the same purposes as mentioned in the discussion of relays 2007 and 2008, among others. When relay 2009 is connected to the power rail and ground rail via relays 2008 and 2007 respectively, it changes state. Upon changing state, relay 2009 opens a signal path from the power rail to the center pin of relay 2016. Relay 2009 denotes the end of light amplitude sensing circuit 303. Additionally, the signal received at the center pin of relay 2016 can be regarded as an "amplitude detection signal"

For the purposes of explanation, it is now assumed that a user inputs an "equals" or "output" command using the user input device 100, causing a light beam to be delivered to output command containment area 304. The amplitude of this light beam, called the output command light value, is of little consequence. The mere presence of the output command light value within output command containment area 304 results in a light beam momentarily shining upon a sensor 2010, which is itself mounted within output command containment area 304. Sensor 2010 is a photoconductive cell or the like that is ultimately responsible for triggering relay 2016 to switch states, thereby allowing signal flow from the power rail to voltage regulator 2017. Additionally, sensor 2010 denotes the beginning of the output sensing circuit 305. In this exemplary embodiment, sensor 2010 is comprised of a 1 MΩ photoconductive cell, but is not limited to this configuration.

As the voltage rises across the sensor 2010, increased amounts of current flow through the device and out of output command containment area 304. Leaving sensor 2010, a signal flows into amplifier 2012. Amplifier 2012 determines when a predetermined threshold has been crossed, signifying the presence of an output command light value within output command containment area 304. Amplifier 2012 is connected to a plurality of resistors and capacitors in a manner well known in the art. Of particular note, pin 4 of amplifier 2012 is connected to trimmer 2011, which allows for manual adjustment of the detection threshold at which an output command light value is said to be within the main light containment area 302. Upon reaching said threshold, amplifier 2012 drives the base of transistor 2013, thereby opening a signal path from a power rail to of relay 2015, thus changing the state of relay 2015.

With the state of relay 2015 changed from closed to open momentarily, (because the output command light value was momentary), relay 2014 is provided with an electrical signal from the power rail, through relay 2015, thereby causing it to switch states. Relay 2014 and its associated electrical components are configured to form a seal in circuit in order to retain the newly switched state, much as has been described in reference to other seal in circuits of the current exemplary embodiment. Relay 2014 denotes the end of the output sensing circuit 305.

With relay 2014 in a persistent open state, an electrical signal flows to relay 2016. Signal flow to relay 2016 causes said relay to change states from closed to open, thereby allowing the amplitude detection signal to flow between from light amplitude sensing circuit 303 to final output circuit 306. Voltage regulator 2017 can be regarded as the beginning of a final output circuit 306, which can be seen in its plural form in FIG. 28.

The (amplitude detection) signal flows from relay 2016 to a voltage regulator 2017. This voltage regulator accepts a signal and produces a regulated signal, which is sent to fiber switch 2018. The parallel bypass capacitors connected to both the input and output of voltage regulator 2017 ensure that a stable signal can flow in and out of the regulator by reducing ripples and spikes within the circuit, much as those mentioned previously. Voltage regulator 2017 is necessary to ensure that fiber optic switch 2018 does not receive a signal of a voltage greater than that which it is rated for. Once a signal has been sent from the voltage regulator to the fiber switch 2018, the switch is engaged and light is thus allowed to flow from an input terminal to an output terminal (not shown). Light is generated by any conventional means, said means being connected to the input terminal of the fiber switch 2018 (not shown). Upon engagement of the fiber switch, a value of "1" (i.e. a light beam corresponding to "1") is outputted via some user identifiable means (i.e. visual inspection of the output terminal of fiber optic switch 2018) and the sum of the exemplary arithmetic equation as previously mentioned (1+0=1) is realized. It is important to note that in another exemplary embodiment, there may be a plurality of fiber optic output ports, each corresponding to a different numerical value and associated light beam of specific amplitude. Therefore, a user may need to examine the output port of each fiber optic switch to determine which was producing a light beam. In doing so, the user would be able to determine the final relation calculated by the logic unit.

It will be appreciated that the foregoing description relates to a new kind of computing device where arithmetic operations are performed with light instead of merely binary values. Whereas a binary computer has only two true variable values (0 and 1), and then uses combinations of these values to represent other values, the light based computer begins with as many variable values as there are distinguishable amplitudes of light. Whereas a binary computer must implement a number of operations to add the values of two or more variables, the light based computer can add light-based variables in a single operation by comingling them at one time in the main light containment area. This new kind of computing device has been described, above, in terms of a concrete implementation; the person familiar with this field will find other specific implementations to be achievable and well within the scope of the appended claims.

It will further be appreciated that the foregoing description does not imply that a specific base system (i.e. base 2, base 10, etc.) must be used in conjunction with the computing device described herein. Additionally, the computing device described herein is not limited to the use of visible light in performing arithmetic operations; electromagnetic radiation in the infrared and ultraviolet range, among other possibilities, may be utilized.

There is claimed:

1. A computing apparatus, comprising:
   a light containment area having an inner surface defining an interior space of the light containment area;
   the inner surface of the light containment area providing two or more distinct light entry ports operable to introduce light into the interior space to provide comingled light, the light introduced by the two or more distinct light entry ports having respective amplitudes associated with corresponding non-binary values; and
   a light amplitude sensing circuit configured to detect a resultant light amplitude value of the comingled light, and to output one of the corresponding non-binary values as a calculation result indicating a sum of the corresponding non-binary values of the light introduced by the two or more distinct light entry ports.

2. The computing apparatus according to claim 1, wherein the light containment area comprises a cubic shape.

3. The computing apparatus according to claim 1, wherein the light containment area comprises a rectangular shape.

4. The computing apparatus according to claim 1, wherein the light containment area comprises a spherical shape.

5. A light-based computing method, comprising:
   associating a plurality of non-binary values with corresponding light amplitude values;
   providing a light containment area having an inner surface defining an interior space of the light containment area, the light containment area further having two or more distinct light entry ports configured to introduce light into the interior space;
   comingling two or more lights in the light containment area to provide comingled light, by using the two or more distinct light entry ports to introduce, into the interior space, the two or more lights, each of the two or more lights having a respective light amplitude value associated with one of the plurality of non-binary values;
   detecting a resultant light amplitude value of the comingled light;
   obtaining, as a calculation result, one of the plurality of non-binary values associated with the resultant light amplitude value; and
   outputting the calculation result.

6. The light-based computing method according to claim 5, wherein the light containment area comprises a cubic shape.

7. The light-based computing method according to claim 5, wherein the light containment area comprises a rectangular shape.

8. The light-based computing method according to claim 5, wherein the light containment area comprises a spherical shape.

* * * * *